US010279579B2

(12) United States Patent
Utsunomiya

(10) Patent No.: US 10,279,579 B2
(45) Date of Patent: May 7, 2019

(54) THREE-DIMENSIONAL OBJECT FORMING APPARATUS, INFORMATION PROCESS APPARATUS CAPABLE OF COMMUNICATING WITH THREE-DIMENSIONAL OBJECT FORMING APPARATUS, METHOD OF CONTROLLING THREE-DIMENSIONAL OBJECT FORMING APPARATUS, METHOD OF PRODUCING THREE-DIMENSIONAL OBJECT USING THREE-DIMENSIONAL OBJECT FORMING APPARATUS, AND THREE-DIMENSIONAL OBJECT FORMING SYSTEM

(71) Applicant: SEIKO EPSON CORPORATION, Tokyo (JP)

(72) Inventor: Kohei Utsunomiya, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 116 days.

(21) Appl. No.: 15/219,926

(22) Filed: Jul. 26, 2016

(65) Prior Publication Data

US 2017/0028650 A1 Feb. 2, 2017

(30) Foreign Application Priority Data

Jul. 30, 2015 (JP) ................................ 2015-150262

(51) Int. Cl.
*B29C 35/08* (2006.01)
*B33Y 30/00* (2015.01)
(Continued)

(52) U.S. Cl.
CPC ............ *B33Y 30/00* (2014.12); *B29C 64/112* (2017.08); *B29C 64/165* (2017.08); *B33Y 10/00* (2014.12); *B29C 64/386* (2017.08); *B29C 64/393* (2017.08)

(58) Field of Classification Search
CPC ................................ B33Y 50/00; B33Y 50/02
See application file for complete search history.

(56) References Cited

U.S. PATENT DOCUMENTS

2002/0079601 A1 6/2002 Russell et al.
2012/0065755 A1* 3/2012 Steingart ............ A61C 13/0019
700/98
(Continued)

FOREIGN PATENT DOCUMENTS

JP 2004-130529 A 4/2004

OTHER PUBLICATIONS

Jin, Support generation for additive manufacturing based on sliced data, May 2015, Springer, 2041-2052 (Year: 2015).*

(Continued)

*Primary Examiner* — William P Bell
*Assistant Examiner* — Andrew L Swanson
(74) *Attorney, Agent, or Firm* — Foley & Lardner LLP

(57) ABSTRACT

A three-dimensional object forming apparatus includes: a head unit; a curing unit; and a forming control unit. The determination unit determines a target voxel in which a dot is formed such that one or a plurality of pillars that extends in a predetermined direction is formed depending on a forming index value which is a value based on a probability that the dot is formed in the voxel on an inside of the three-dimensional object, and the number of pillars of the one or the plurality of pillars, which have a cross section of which a length in a first direction is greater than a length in a second direction crossing the first direction, is greater than the number of pillars, which have a cross section of which the length in the second direction is greater than the length in the first direction.

6 Claims, 18 Drawing Sheets

(51) Int. Cl.
*B33Y 10/00* (2015.01)
*B29C 64/112* (2017.01)
*B29C 64/165* (2017.01)
B29C 64/386 (2017.01)
B29C 64/393 (2017.01)

(56) References Cited

U.S. PATENT DOCUMENTS

2014/0052407 A1* 2/2014 Ladd .................. G01B 13/16
702/167
2016/0025657 A1* 1/2016 Shahbazmohamadi .. G10D 9/02
378/20

OTHER PUBLICATIONS

Non-Final Office Action dated Jul. 26, 2018 in related U.S. Appl. No. 15/219,858 (15 pgs.).
Brackett, D. et al. "A dithering based method to generate variable volume lattice cells for additive manufacturing." 22nd Annual International Solid Freeform Fabrication Symposium—An Additive Manufacturing Conference, SFF 2011, pp. 671-679.
Final Office Action dated Dec. 27, 2018 in related U.S. Appl. No. 15/219,858 (19 pgs.).

* cited by examiner

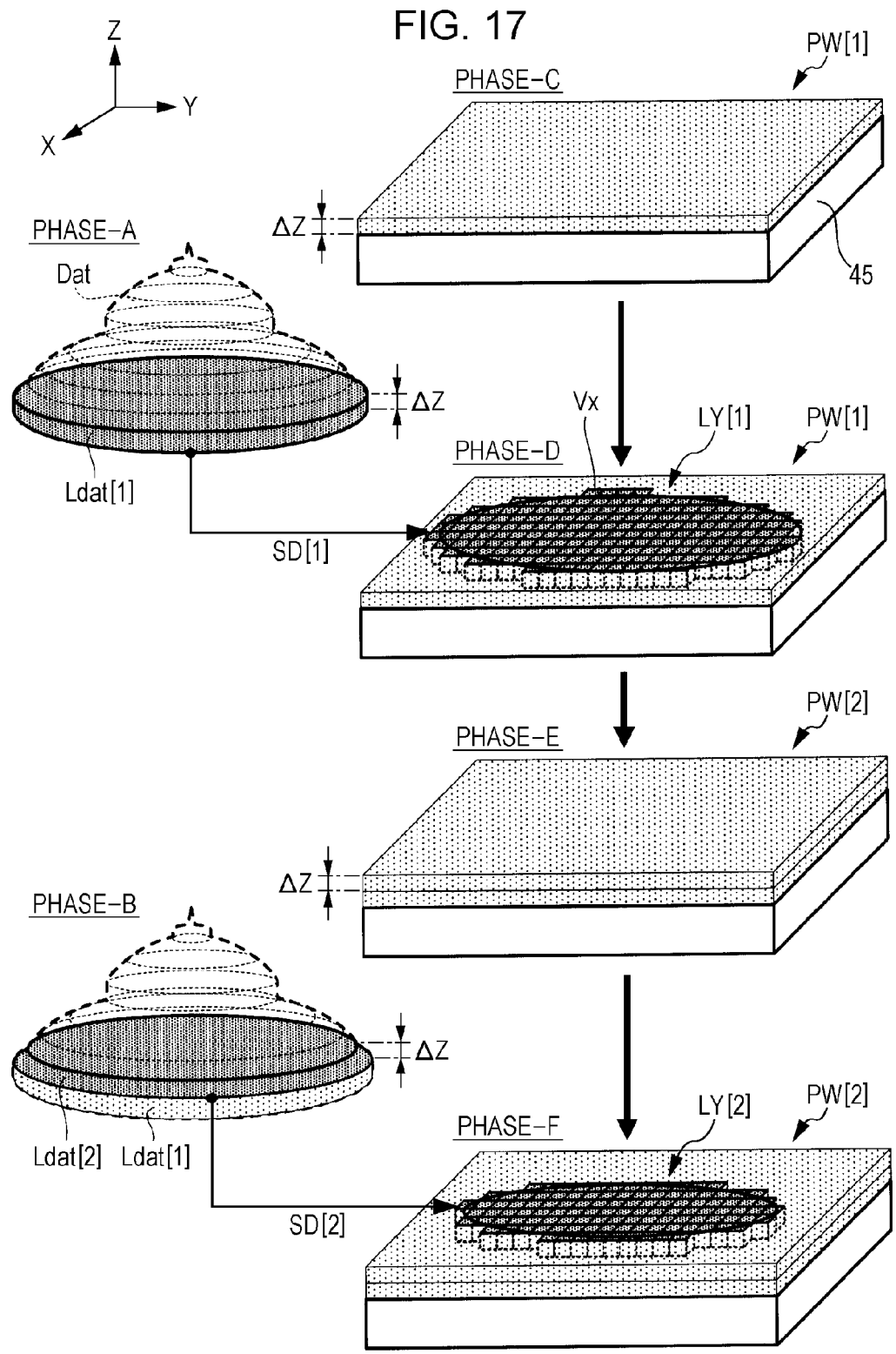

THREE-DIMENSIONAL OBJECT FORMING APPARATUS, INFORMATION PROCESS APPARATUS CAPABLE OF COMMUNICATING WITH THREE-DIMENSIONAL OBJECT FORMING APPARATUS, METHOD OF CONTROLLING THREE-DIMENSIONAL OBJECT FORMING APPARATUS, METHOD OF PRODUCING THREE-DIMENSIONAL OBJECT USING THREE-DIMENSIONAL OBJECT FORMING APPARATUS, AND THREE-DIMENSIONAL OBJECT FORMING SYSTEM

BACKGROUND

1. Technical Field

The present invention relates to a three-dimensional object forming apparatus, an information process apparatus capable of communicating with a three-dimensional object forming apparatus, a method of controlling three-dimensional object forming apparatus, a method of producing a three-dimensional object using a three-dimensional object forming apparatus, and a three-dimensional object forming system.

2. Related Art

In recent years, various three-dimensional object forming apparatuses such as a 3D printer have been suggested. The three-dimensional object forming apparatus performs a forming process which is a process of forming a three-dimensional object by curing a liquid such as an ink discharged from a head unit, forming a dot using the cured liquid, and stacking structure layers formed as a set of dots.

In order to simultaneously obtain the strength of the formed three-dimensional object while reducing a liquid amount necessary to form a three-dimensional object in the three-dimensional object forming apparatus, a technology of forming a support structure such as a honeycomb structure or a mesh structure which supports an outer shell of the three-dimensional object from the inside on an inside of the three-dimensional object has been suggested (for example, JP-A-2004-130529).

However, in a case where the three-dimensional object is formed, it is necessary to form the three-dimensional object such that various requirements (hereinafter, referred to as the "requirements of the three-dimensional object") such as a shape of the three-dimensional object, strength necessary for the three-dimensional object, and a liquid amount capable of being used to form the three-dimensional object which are to be considered in forming the three-dimensional object are satisfied. Even in a case where a support structure is provided on the inside of the three-dimensional object, it is necessary to form the three-dimensional object such that the requirements of the three-dimensional object are satisfied. Thus, in a case where the support structure is provided on the inside of the three-dimensional object, a user of the three-dimensional object forming apparatus needs to determine the support structure in consideration of the requirements of the three-dimensional object, and a large load is imposed on the user in some cases.

SUMMARY

An advantage of some aspects of the invention is to provide a technology capable of reducing a load of determining a support structure of a three-dimensional object on a user.

According to an aspect of the invention, there is provided a three-dimensional object forming apparatus including: a head unit that is capable of discharging a liquid; a curing unit that cures the liquid discharged from the head unit, and forms a dot; and a forming control unit that controls an operation of the head unit such that a three-dimensional object is formed as an aggregate of dots by representing a shape of the three-dimensional object to be formed as a voxel-set and forming a dot in a voxel of the voxel-set which is determined as a target in which the dot is formed by a determination unit. The determination unit determines a target voxel in which a dot is formed such that one or a plurality of pillars that extends in a predetermined direction is formed depending on a forming index value which is a value based on a probability that the dot is formed in the voxel on an inside of the three-dimensional object, and the number of pillars of the one or the plurality of pillars, which have a cross section of which a length in a first direction is greater than a length in a second direction crossing the first direction, is greater than the number of pillars, which have a cross section of which the length in the second direction is greater than the length in the first direction.

According to the aspect of the invention, the structure of one or the plurality of pillars on the inside of the three-dimensional object is determined by determining the target voxel in which the dot is formed depending on the forming index value. In other words, the support structure on the inside of the three-dimensional object is determined depending on a dot forming rate for each voxel. Here, the dot forming rate for each voxel is determined depending on a liquid amount capable of being used to form the three-dimensional object, strength necessary for the three-dimensional object or the like. Thus, it is possible to determine the support structure of the three-dimensional object such that the requirements of the three-dimensional object such that the liquid amount capable of being used to form the three-dimensional object or the strength necessary for the three-dimensional object are satisfied.

According to the aspect of the invention, the support structure of the three-dimensional object is determined such that the number of pillars having the cross section long in the first direction is greater than the number of pillars having the cross section long in the second direction. That is, it is possible to form the support structure on the side of the three-dimensional object in which the strength of the pillar in an extending direction is greater than the strength of the pillar in the second direction and the strength in the first direction is greater than the strength in the second direction. Thus, it is possible to form the support structure of obtaining the strength depending on the shape of the three-dimensional object by adjusting a posture of the three-dimensional object with respect to the first direction and the second direction or adjusting the first direction and the second direction to be an orientation depending on the shape of the three-dimensional object.

In the present specification, the voxel is a virtual three-dimensional figure such as a virtual cuboid or a virtual cube in order to represent a space where one dot can be formed.

In the present specification, the voxel-set is a set in which the plurality of voxels is collected. It is assumed that the plurality of voxels included in the voxel-set for approximating the shape of the three-dimensional object has substantially the same shape.

In the three-dimensional object forming apparatus, it is preferable that the length of the three-dimensional object in the second direction is equal to or greater than the length of the three-dimensional object in the first direction.

In a case where the support structure is not provided on the inside of the three-dimensional object, since the strength in the first direction is equal to or less than the strength in the second direction, the three-dimensional object of which the length in the second direction is equal to or greater than the length in the first direction has a high possibility that desired strength is not able to be obtained in the first direction.

In contrast, in this aspect, the support structure in which the strength in the first direction is greater than the strength in the second direction is provided on the inside of the three-dimensional object. Thus, it is possible to more easily obtain the desired strength in the first direction in the three-dimensional object than a case where the support structure is not provided on the inside of the three-dimensional object.

In the three-dimensional object forming apparatus according to this aspect, the first direction and the second direction may be determined such that the length of the three-dimensional object in the second direction is equal to or greater than the length of the three-dimensional object in the first direction.

In the three-dimensional object forming apparatus, it is preferable that one pillar is formed on the inside of the three-dimensional object such that a cross-sectional area in a case where the forming index value is a first value is greater than a cross-sectional area in a case where the forming index value is a second value which is less than the first value.

According to this aspect, in a case where the dot forming rate is increased, it is possible to determine the support structure of the three-dimensional object such that the cross-sectional area of the pillar is increased. Thus, even in a case where the liquid amount capable of being used to form the three-dimensional object is changed and the dot forming rate is changed, it is possible to determine the support structure having the strength depending on the dot forming rate without greatly increasing the load on the user of the three-dimensional object forming apparatus.

In the three-dimensional object forming apparatus, it is preferable that the number of pillars formed on the inside of the three-dimensional object in a case where the forming index value is a first value is greater than the number of pillars formed in the three-dimensional object in a case where the forming index value is a second value which is less than the first value.

According to this aspect, in a case where the dot forming rate is increased, it is possible to determine the support structure of the three-dimensional object such that the number of pillars is increased. Thus, even in a case where the liquid amount capable of being used to form the three-dimensional object is changed and the dot forming rate is changed, it is possible to determine the support structure having the strength depending on the dot forming rate without greatly increasing the load on the user of the three-dimensional object forming apparatus.

According to another aspect of the invention, there is provided a three-dimensional object forming apparatus including: a head unit that is capable of discharging a liquid; a curing unit that cures the liquid discharged from the head unit, and forms a dot; and a forming control unit that controls an operation of the head unit such that a three-dimensional object is formed as an aggregate of dots by representing a shape of the three-dimensional object to be formed as a voxel-set and forming a dot in a voxel of the voxel-set which is determined as a target in which the dot is formed by a determination unit. The determination unit determines a target voxel in which a dot is formed depending on a forming index value which is a value based on a probability that the dot is formed in the voxel on an inside of the three-dimensional object, and a probability that the dot is formed in both of a first voxel of the voxel-set which is positioned on the inside of the three-dimensional object and a second voxel thereof which is positioned on the inside of the three-dimensional object and is separated from the first voxel at a distance of a predetermined value or less is greater than a probability that the dot is formed in both of the first voxel of the voxel-set and a third voxel thereof which is positioned on the inside of the three-dimensional object and is separated from the first voxel at a distance of a predetermined vale or greater.

According to the aspect of the invention, the support structure on the inside of the three-dimensional object is determined depending on the dot forming rate for each voxel. Thus, it is possible to determine the support structure of the three-dimensional object such that the requirements of the three-dimensional object such that the liquid amount capable of being used to form the three-dimensional object or the strength necessary for the three-dimensional object are satisfied.

According to the aspect of the invention, for example, since a possibility that two dots are formed adjacent to each other in both the first voxel and the second voxel is greater than a possibility that two dots are discretely formed in both the first voxel and the third voxel, it is possible to increase the strength of the support structure on the inside of the three-dimensional object. Accordingly, it is possible to increase the strength of the three-dimensional object.

A three-dimensional object forming apparatus according to the invention may include a head unit that is capable of discharging a liquid, a curing unit that cures the liquid discharged from the head unit and forms a dot, and a forming control unit that controls an operation of the head unit such that a three-dimensional object is formed as an aggregate of dots by representing a shape of the three-dimensional object to be formed as a voxel-set and forming a dot in a voxel of the voxel-set which is determined as a target in which the dot is formed by a determination unit. The determination unit may determine a voxel in which the dot is formed depending on a result of comparing a forming index value which is a value based on a probability that the dot is formed in the voxel on an inside of the three-dimensional object with a threshold of a dither mask. The threshold of the dither mask may be set such that a probability that the dot is formed in both of a first voxel of the voxel-set which is positioned on the inside of the three-dimensional object and a second voxel thereof which is positioned on the inside of the three-dimensional object and is separated from the first voxel at a distance of a predetermined value or less is greater than a probability that the dot is formed in both of the first voxel of the voxel-set and a third voxel thereof which is positioned on the inside of the three-dimensional object and is separated from the first voxel at a distance of a predetermined value or greater.

In the three-dimensional object forming apparatus, it is preferable that the determination unit determines a target voxel in which the dot is formed such that one or a plurality of pillars which extends in a predetermine direction is formed on the inside of the three-dimensional object depending on a result of comparing the forming index value with a threshold of a dither mask.

According to this aspect, for example, it is determined whether or not to form the dots in the respective voxels on the inside of the three-dimensional object depending on the comparison result of the forming index value with the plurality of thresholds of the dither matrix, and thus, the support structure of the three-dimensional object is determined. Thus, even in a case where the forming index value is changed according to a change in the strength necessary for the three-dimensional object or a change in the liquid amount capable of being used to form the three-dimensional object, it is possible to determine the internal structure of the three-dimensional object depending on the forming index value without greatly increasing the load on the user of the three-dimensional object forming apparatus.

In this aspect, the threshold of the dither mask may be set such that the number of pillars of the one or the plurality of pillars, which have the cross section of which the length in the first direction is greater than the length in the second direction crossing the first direction, is greater than the number of pillars which have the cross section of which the length in the second direction is greater than the length in the first direction.

In this aspect, the threshold of the dither mask may be set in one pillar formed on the inside of the three-dimensional object such that the cross-sectional area of the one pillar in a case where the forming index value is the first value is greater than the cross-sectional area of the one pillar in a case where the forming index value is the second value which is less than the first value.

In this aspect, the threshold of the dither mask may be set such that the number of pillars formed on the inside of the three-dimensional object in a case where the forming index value is the first value is greater than the number of pillars formed on the inside of the three-dimensional object in a case where the forming index value is the second value which is less than the first value.

According to still another aspect of the invention, there is provided a three-dimensional object forming apparatus including: a head unit that is capable of discharging a liquid; a curing unit that cures the liquid discharged from the head unit, and forms a dot; a forming control unit that controls an operation of the head unit such that a three-dimensional object is formed as an aggregate of dots by representing a shape of the three-dimensional object to be formed as a voxel-set and forming a dot in a voxel of the voxel-set which is determined as a target in which the dot is formed; and a determination unit that determines a target voxel in which a dot is formed such that one or a plurality of pillars that extends in a predetermined direction is formed depending on a forming index value which is a value based on a probability that the dot is formed in the voxel on an inside of the three-dimensional object. The number of pillars of the one or the plurality of pillars, which have a cross section of which a length in a first direction is greater than a length in a second direction crossing the first direction, is greater than the number of pillars, which have a cross section of which the length in the second direction is greater than the length in the first direction.

According to the aspect of the invention, the support structure on the inside of the three-dimensional object is determined depending on the dot forming rate for each voxel. Thus, it is possible to determine the support structure of the three-dimensional object such that the requirements of the three-dimensional object such as the liquid amount capable of being used to form the three-dimensional object and the strength necessary for the three-dimensional object are satisfied.

According to still another aspect of the invention, there is provided a method of controlling a three-dimensional object forming apparatus that includes a head unit that is capable of discharging a liquid, and a curing unit that cures the liquid discharged from the head unit and forms a dot. The method includes: controlling an operation of the head unit such that a three-dimensional object is formed as an aggregate of dots by representing a shape of the three-dimensional object to be formed as a voxel-set and forming a dot in a voxel of the voxel-set which is determined as a target in which the dot is formed; and determining a target voxel in which a dot is formed such that one or a plurality of pillars that extends in a predetermined direction is formed depending on a forming index value which is a value based on a probability that the dot is formed in the voxel on an inside of the three-dimensional object. The number of pillars of the one or the plurality of pillars, which have a cross section of which a length in a first direction is greater than a length in a second direction crossing the first direction, is greater than the number of pillars, which have a cross section of which the length in the second direction is greater than the length in the first direction.

According to this aspect, the support structure on the inside of the three-dimensional object is determined depending on the dot forming rate for each voxel. Thus, it is possible to determine the support structure of the three-dimensional object such that the requirements of the three-dimensional object such as the liquid amount capable of being used to form the three-dimensional object and the strength necessary for the three-dimensional object are satisfied.

According to still another aspect of the invention, there is provided a method of producing a three-dimensional object using a three-dimensional object forming apparatus that includes a head unit that is capable of discharging a liquid, and a curing unit that cures the liquid discharged from the head unit and forms a dot. The method includes: representing a shape of a three-dimensional object to be formed as a voxel-set; determining a target voxel of the voxel-set in which a dot is formed such that one or a plurality of pillars that extends in a predetermined direction is formed depending on a forming index value which is a value based on a probability that the dot is formed in the voxel on an inside of the three-dimensional object; and producing the three-dimensional object as an aggregate of dots such that the voxel of the voxel-set determined as a target in which the dot is formed by discharging the liquid from the head unit. The number of pillars of the one or the plurality of pillars, which have a cross section of which a length in a first direction is greater than a length in a second direction crossing the first direction, is greater than the number of pillars, which have a cross section of which the length in the second direction is greater than the length in the first direction.

According to this aspect, the support structure on the inside of the three-dimensional object is determined depending on the dot forming rate for each voxel. Thus, it is possible to determine the support structure of the three-dimensional object such that the requirements of the three-dimensional object such as the liquid amount capable of being used to form the three-dimensional object and the strength necessary for the three-dimensional object are satisfied.

According to still another aspect of the invention, there is provided an information processing apparatus capable of communicating with a three-dimensional object forming apparatus that includes a head unit that is capable of discharging a liquid, a curing unit that cures the liquid discharged from the head unit and forms a dot, and a forming control unit that controls an operation of the head unit such that a three-dimensional object is formed as an aggregate of dots by representing a shape of the three-dimensional object to be formed as a voxel-set and forming a dot in a voxel of the voxel-set which is determined as a target in which the dot is formed. The apparatus includes: a determination unit that determines a target voxel in which a dot is formed such that one or a plurality of pillars that extends in a predetermined direction is formed depending on a forming index value which is a value based on a probability that the dot is formed in the voxel on an inside of the three-dimensional object. The forming control unit controls an operation of the head unit according to the determination result of the determination unit, and the number of pillars of the one or the plurality of pillars, which have a cross section of which a length in a first direction is greater than a length in a second direction crossing the first direction, is greater than the number of pillars, which have a cross section of which the length in the second direction is greater than the length in the first direction.

According to this aspect, the support structure on the inside of the three-dimensional object is determined depending on the dot forming rate for each voxel. Thus, it is possible to determine the support structure of the three-dimensional object such that the requirements of the three-dimensional object such as the liquid amount capable of being used to form the three-dimensional object and the strength necessary for the three-dimensional object are satisfied.

BRIEF DESCRIPTION OF THE DRAWINGS

The invention will be described with reference to the accompanying drawings, wherein like numbers reference like elements.

FIG. 17 is a diagram for describing the forming of the three-dimensional object according to Modification Example 10.

DESCRIPTION OF EXEMPLARY EMBODIMENTS

Hereinafter, embodiments for performing the invention will be described with reference to the drawings. In the respective drawings, dimensions and scales of the respective components are appropriately different from actual dimensions and scales. Embodiments to be described below are preferred specific examples of the invention and therefore are given various technically preferable limitations, but the scope of the invention is not limited to these embodiments unless specific description limiting the invention is provided in the following description.

A. EMBODIMENT

In the present embodiment, as a three-dimensional object forming apparatus, a three-dimensional object forming apparatus of an ink jet type in which a resin ink including resin emulsion or a curable ink (an example of a "liquid") such as an ultraviolet curable ink is discharged and a three-dimensional object Obj is formed by using the discharged ink will be described.

1. Configuration of Three-Dimensional Object Forming System

Hereinafter, the configuration of a three-dimensional object forming system 100 including a three-dimensional object forming apparatus 1 according to the present embodiment will be described with reference to FIGS. 1 to 7.

Figure 1:
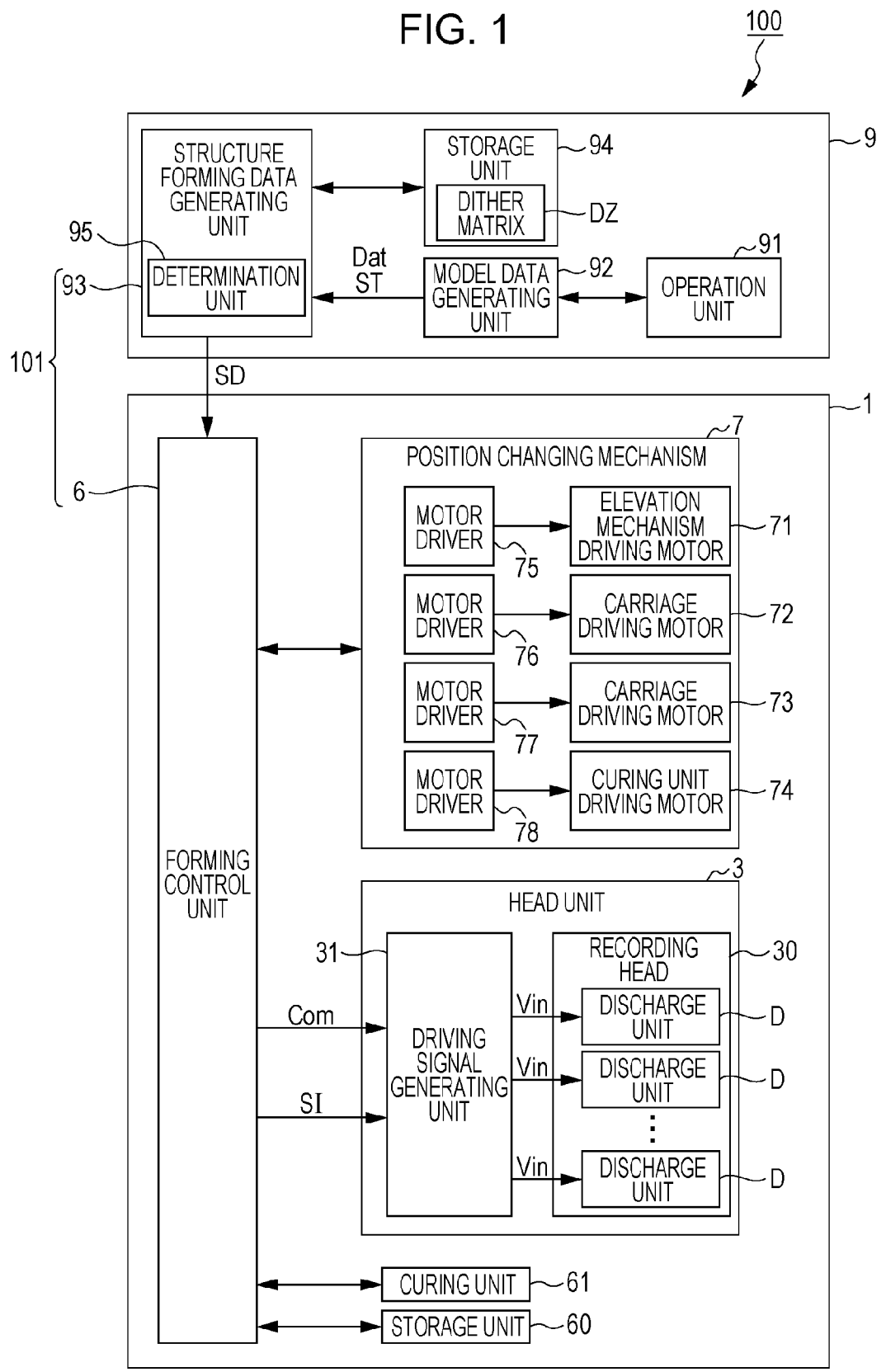
FIG. 1 is a block diagram showing the configuration of a three-dimensional object forming system according to the invention.

FIG. 1 is a functional block diagram showing the configuration of the three-dimensional object forming system 100.

As shown in FIG. 1, the three-dimensional object forming system 100 includes the three-dimensional object forming apparatus 1 that performs a forming process of discharging an ink, forming a stacked structure LY (an example of a "structure layer") having as much thickness as one dot by dots formed using the discharged ink, and forming the three-dimensional object Obj by stacking structures LY, and a host computer 9 (an example of "information processing apparatus") that performs a structure forming data generating process of generating structure forming data SD indicating the respective shapes and colors of the plurality of objects LY constituting the three-dimensional object Obj formed by the three-dimensional object forming apparatus 1.

1.1. Host Computer

As shown in FIG. 1, a host computer 9 includes a CPU (not shown) that controls the operations of the respective components of the host computer 9, a display operation unit 91 that includes a display, a keyboard, a mouse or the like, and a storage unit 94 that stores various information items.

The storage unit 94 stores a control program of the host computer 9, a driver program of the three-dimensional object forming apparatus 1, and an application such as computer aided design (CAD) software. The storage unit 94 stores a dither mask DZ. The dither mask DZ is acquired by arranging a plurality of predetermined thresholds in a matrix shape. Although the details are described below, but the dither mask DZ is used to generate structure forming data SD in the structure forming data generating process.

The driver program of the three-dimensional object forming apparatus 1 is an example of a "program of the information processing apparatus" which is stored in the storage unit 94 of the host computer 9 and is executed in the host computer 9.

The CPU of the host computer 9 functions as a model data generating unit 92 by executing an application program stored in the storage unit 94. The model data generating unit 92 performs a model data generating process which is a process of generating model data Dat based on information or the like input by an operation of a user of the three-dimensional object forming system 100 performed on the display operation unit 91.

The model data Dat is data indicating a shape and color of a model for representing the three-dimensional object Obj formed by the three-dimensional object forming apparatus 1. It is assumed that the color of the three-dimensional object Obj indicated by the model data Dat means the kind of color given to the three-dimensional object Obj and includes a method of giving a plurality of colors to the three-dimensional object in a case where the three-dimensional object Obj is colored by the plurality of colors, that is, a pattern, a character or other images represented by the plurality of colors given to the three-dimensional object Obj.

In the present embodiment, it is assumed that the model data Dat designates the external shape of the model of the three-dimensional object Obj. In other words, the model data Dat according to the present embodiment designates the shape of an outer surface SF which is the contour of the model of the three-dimensional object Obj. For example, in a case where the three-dimensional object Obj is a spherical object, the model data Dat designates a shape of a spherical surface which is the contour of the spherical object and color to be given to the spherical surface. However, the invention is not limited to such an aspect, and the model data Dat may be data including at least information capable of specifying the shape of the external surface SF of the model of the three-dimensional object Obj. For example, the model data Dat may designate a shape of the inside of the model of the three-dimensional object Obj positioned on an inner side than the external surface SF or a material or the like of the three-dimensional object Obj in addition to the shape and color of the external surface SF of the model of the three-dimensional object Obj.

For example, as the model data Dat, a data format such as additive manufacturing file format (AMF) or standard triangulated language (STL) may be used.

The model data generating unit 92 generates a strength index value ST based on at least one of the information input by the operation of the user of the three-dimensional object forming system 100 on the display operation unit 91 and the shape of the model of the three-dimensional object Obj indicated by the model data Dat.

The strength index value ST may have any value as long as a value based on strength necessary for the three-dimensional object Obj is used.

For example, the strength index value ST may have a value indicating a level of the strength necessary for the three-dimensional object Obj such that the strength index value is "1" in a case where the strength of the three-dimensional object Obj is "high", is "2" in a case where the strength thereof is "medium" and is "3" in a case where the strength thereof is "low".

The strength necessary for the three-dimensional object Obj is determined by the kind of ink for forming the three-dimensional object Obj or an ink amount capable of being used to form the three-dimensional object Obj. In a case where the ink amount used in the three-dimensional object Obj is increased, it takes a long time to form the three-dimensional object Obj (forming speed becomes slow) in some cases. Thus, for example, as the strength index value ST, a value indicating the kind of ink used to for the three-dimensional object Obj, a value based on the forming speed or forming time of the three-dimensional object Obj, a value based on the ink amount used to form the three-dimensional object Obj, or the like may be used. Here, for example, the value based on the ink amount used to form the three-dimensional object Obj is a charging rate of the ink on the inside of the three-dimensional object Obj, a ratio of a volume of the ink for forming the three-dimensional object Obj to a volume of the three-dimensional object Obj, or the like.

The CPU of the host computer 9 functions as the structure forming data generating unit 93 by executing the driver program of the three-dimensional object forming apparatus 1 stored in the storage unit 94. The structure forming data generating unit 93 performs the structure forming data generating process. The structure forming data generating process is a process of generating the structure forming data SD which designates the shape and color of the structure LY formed by the three-dimensional object forming apparatus 1 based on the model data Dat and the strength index value ST.

As shown in FIG. 1, the structure forming data generating unit 93 includes a determination unit 95. In other words, the CPU of the host computer 9 functions as the determination unit 95 by executing the driver program of the three-dimensional object forming apparatus 1 in some cases. Although the details are described below, the determination unit 95 performs a target voxel determining process of comparing a dot forming index value RF generated based on the strength index value ST with a threshold of the dither mask DZ, and determining the arrangement of dots constituting the structure LY based on the comparison result. The target voxel determining process is a part of the structure forming data generating process.

Here, the dot forming index value RF is a value depending on a dot forming rate α which is a ratio of the number of dots formed in reality on the inside of the three-dimensional object Obj to the number of dots capable of being formed on the inside of the three-dimensional object Obj.

As described above, in the present embodiment, it is assumed that the three-dimensional object Obj is formed by stacking Q number of structures LY (Q is a natural number which satisfies Q≥2). Hereinafter, a process of forming the structures LY by means of the three-dimensional object forming apparatus 1 is referred to as a stacking process. That is, the forming process of forming the three-dimensional object Obj by means of the three-dimensional object forming apparatus 1 includes Q number of stacking processes. Among the structures LY which are respectively formed in Q number of stacking processes included in the forming process, the structure LY formed in the q-th stacking process is referred to as a structure LY[q]. The structure forming data SD for designating the shape and color of the structure LY[q] is referred to as structure forming data SD[q] (q is a natural number which satisfies 1≤q≤Q).

The structure forming data generating unit 93 receives the result of the target voxel determining process of the determination unit 95, and generates the structure forming data items SD[1] to SD[Q].

1.2. Three-Dimensional Object Forming Apparatus

Hereinafter, the three-dimensional object forming apparatus 1 will be described with reference to FIG. 2 in addition to FIG. 1.

Figure 2:
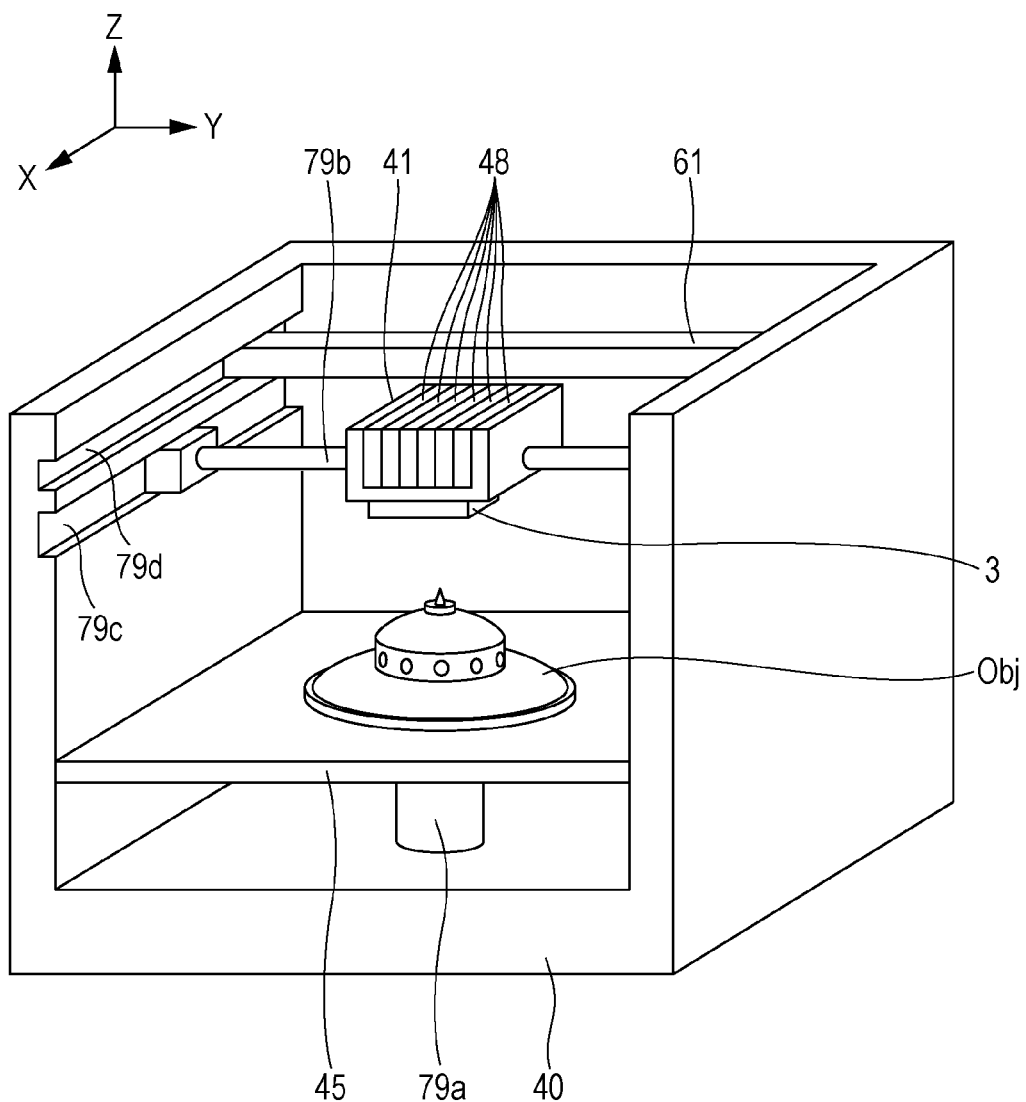
FIG. 2 is a schematic perspective view of a three-dimensional object forming apparatus.

FIG. 2 is a perspective view showing the outline of the structure of the three-dimensional object forming apparatus 1.

As shown in FIGS. 1 and 2, the three-dimensional object forming apparatus 1 includes a housing 40, a forming table 45, a forming control unit 6 that controls the operations of the respective units of the three-dimensional object forming apparatus 1, a head unit 3 that is provided with a recording head 30 including discharge units D which discharge inks to the forming table 45, a curing unit 61 that cures the inks discharged on the forming table 45, six ink cartridges 48 that store inks, a carriage 41 that mounts the head unit 3 and the ink cartridges 48 thereon, a position changing mechanism 7 for changing relative positions of the head unit 3, the forming table 45 and the curing unit 61 with respect to the housing 40, and a storage unit 60 that stores the control program of the three-dimensional object forming apparatus 1 or other various information items.

Among these units, the forming control unit 6 and the structure forming data generating unit 93 function as a system control unit 101 that controls the operations of the respective units of the three-dimensional object forming system 100.

The curing unit 61 is a constituent element for curing the ink discharged on the forming table 45, and may be, for example, a light source for applying ultraviolet rays to the ultraviolet curable ink, a heating device for heating the resin ink, or the like. For example, in a case where the curing unit 61 is the ultraviolet light source, the curing unit 61 may be provided above the forming table 45 (in a +Z direction). In the following description, it is assumed that the curing unit 61 is the ultraviolet light source, and it is assumed that the curing unit 61 is positioned above the forming table 45 in the +Z direction.

In the present specification, a 3-axis orthogonal coordinate system is introduced in order to describe the directions. The coordinate system includes a Z axis set such that a stacking direction of the structures LY which is a +Z direction, an X axis set such that the stacking direction of the structures is parallel to an extending direction of a guide 79c to be described below, and a Y axis set such that the stacking direction of the structures is parallel to an extending direction of a guide 79b to be described below. The origin of the coordinate system may be determined in an arbitrary position.

Six ink cartridges 48 are provided so as to correspond to a total of six kinds of inks including five kinds of forming inks for forming the three-dimensional object Obj and a support ink for forming a support section in a one-to-one correspondence. The respective ink cartridges 48 store inks of kinds corresponding to the ink cartridges 48.

The five kinds of forming inks for forming the three-dimensional object Obj include chromatic color inks having chromatic color material components, achromatic color inks having achromatic color material components, and clear (CL) inks in which the content of color materials per unit weight or unit volume is less than the contents of those of the chromatic color inks and the achromatic color inks. In the present embodiment, as the chromatic color ink, three kinds of inks of cyan (CY), magenta (MG) and yellow (YL) are used. In the present embodiment, as the achromatic color ink, a white (WT) ink is used. The clear ink is an ink in which the content of color material components is less and transparency is higher than those of the chromatic color ink and the achromatic color inks. In the following description, among the five kinds of forming inks, three kinds of chromatic color inks and one kind of achromatic color ink are collectively referred to as the color inks in some cases.

In the present embodiment, the respective ink cartridges 48 are mounted on the carriage 41, but the ink cartridge 48 may be provided in another position of the three-dimensional object forming apparatus 1 instead of being mounted on the carriage 41.

As shown in FIGS. 1 and 2, the position changing mechanism 7 includes an elevation mechanism driving motor 71 for driving a forming table elevation mechanism 79a such that the forming table 45 is moved up and down in the +Z direction and the −Z direction (hereinafter, the +Z direction and the −Z direction are collectively referred to as a "Z-axis direction" in some cases), a carriage driving motor 72 for moving the carriage 41 in the +Y direction and the −Y direction (hereinafter, the +Y direction and the −Y direction are collectively referred to as a "Y-axis direction" in some cases) along the guide 79b, a carriage driving motor 73 for moving the carriage 41 in the +X direction and the −X direction (hereinafter, the +X direction and the −X direction are collectively referred to as an "X-axis direction in some cases) along the guide 79c, and a curing unit driving motor 74 for moving the curing unit 61 in the X-axis direction along a guide 79d. The position changing mechanism 7 includes a motor driver 75 for driving the elevation mechanism driving motor 71, a motor driver 76 for driving the carriage driving motor 72, a motor driver 77 for driving the carriage driving motor 73, and a motor driver 78 for driving the curing unit driving motor 74.

The storage unit 60 includes an electrically erasable programmable read-only memory (EEPROM) which is a kind of non-volatile semiconductor memories that store the structure forming data SD supplied from the host computer 9, a random access memory (RAM) that temporarily stores data items required when various processes such as the forming process of forming the three-dimensional object Obj or temporarily develops the control program for controlling the respective units of the three-dimensional object forming apparatus 1 such that various processes such as the forming process are performed, and a PROM which is a kind of non-volatile semiconductor memories that store the control program.

The three-dimensional object forming apparatus 1 includes a central processing unit (CPU), a field-programmable gate array (FPGA), or the like (not shown). The CPU, FPGA or the like provided in the three-dimensional object forming apparatus 1 functions as the forming control unit 6 that controls the operations of the respective units of the three-dimensional object forming apparatus 1 by being operated according to the control program stored in the storage unit 60.

In a case where the structure forming data SD is supplied from the host computer 9, the forming control unit 6 controls the execution of the process of forming the three-dimensional object Obj on the forming table 45 according to the model data Dat by controlling the operations of the head unit 3 and the position changing mechanism 7.

Specifically, the forming control unit 6 initially stores the structure forming data SD supplied from the host computer 9 in the storage unit 60. Subsequently, based on various data items such as the structure forming data SD stored in the storage unit 60, the forming control unit 6 controls the operation of the head unit 3, and generates various signals including a driving waveform signal Com and a waveform designation signal SI for driving the discharge units D. The forming control unit 6 generates various signals for controlling the operations of the motor drivers 75 to 78 based on various data items such as the structure forming data SD stored in the storage unit 60.

In the present embodiment, the driving waveform signal Com is an analog signal. Thus, the forming control unit 6 according to the present embodiment includes a DA conversion circuit (not shown) in addition to functional blocks realized by which the CPU or the like of the three-dimensional object forming apparatus 1 is operated according to the control program. A digital driving waveform signal generated in the CPU or the like included in the forming control unit 6 is converted into an analog driving waveform signal Com by means of the DA conversion circuit included in the forming control unit 6, and is output.

As described above, the forming control unit 6 controls the relative position of the head unit 3 with respect to the forming table 45 by controlling the motor drivers 75, 76 and 77. The forming control unit 6 controls the relative position of the curing unit 61 with respect to the forming table 45 by controlling the motor drivers 75 and 78. The forming control unit 6 controls whether or not to discharge the inks from the discharge units D, a discharge amount of the inks, a discharge timing of the inks and the like by controlling the head unit 3.

Accordingly, the forming control unit 6 controls the execution of the stacking process of forming dots on the forming table 45 while adjusting the size of dots and the arrangement of dots and forming the structures LY using the formed dots. The forming control unit 6 controls the execution of the forming process of stacking new structures LY on the structure LY that is already formed (in the +Z direction) by repeatedly performing the stacking process and forming the three-dimensional object Obj corresponding to the model data Dat.

As shown in FIG. 1, the head unit 3 includes the recording head 30 including M number of discharge units D, and a driving signal generating unit 31 that generates driving signals Vin for driving the discharge units D (M is a natural number of 1 or more). In the following description, in order to respectively distinguish M number of discharge units D provided in the recording head 30, M number of discharge units are sequentially referred to as a first stage, a second stage, ..., and an M-th stage in some cases. In the following description, an m-th stage discharge unit D of M number of discharge units D provided in the recording head 30 is represented as a discharge unit D[m] in some cases (m is a natural number that satisfies 1≤m≤M). Among the driving signals Vin generated by the driving signal generating unit 31, the driving signal Vin for driving the discharge unit D[m] is represented as a driving signal Vin[m] in some cases. The details of the driving signal generating unit 31 are described below.

1.3. Recording Head

Hereinafter, the recording head 30 and the discharge units D provided in the recording head 30 will be described with reference to FIGS. 3 to 5.

Figure 3:
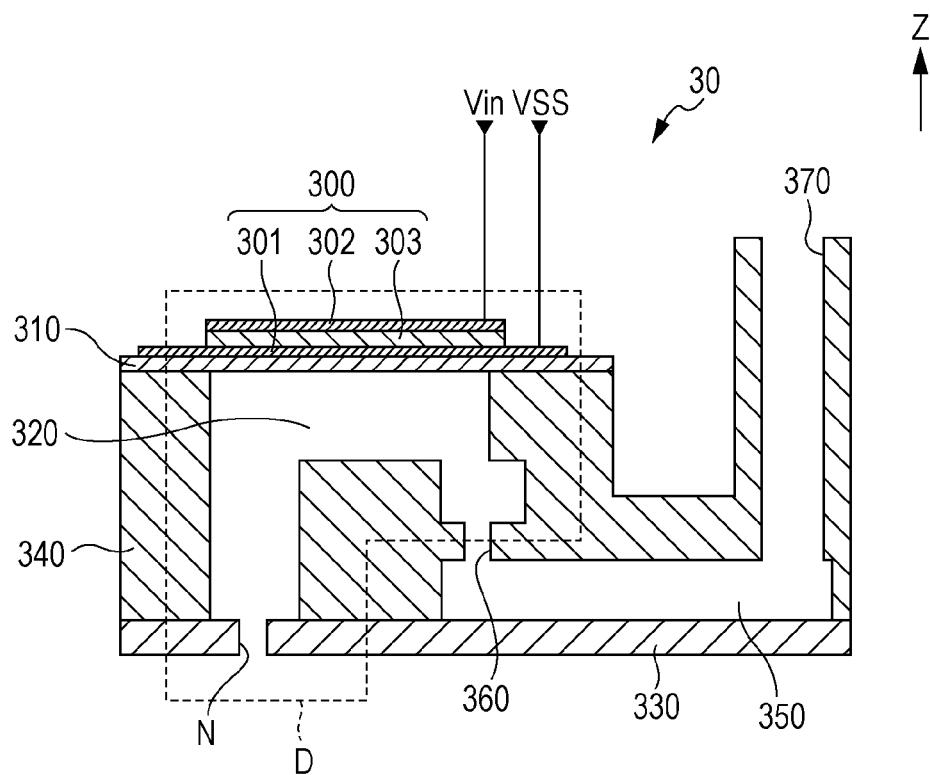
FIG. 3 is a schematic sectional view of a recording head.

FIG. 3 is an example which schematically shows a partial sectional view of the recording head 30. In this drawing, for the sake of convenient illustration, of the recording head 30, one discharge unit D of M number of discharge units D included in the recording head 30, a reservoir 350 that is communicatively connected to the one discharge unit D through an ink supply hole 360, an ink inlet 370 for supplying the inks to the reservoir 350 from the ink cartridges 48 are shown.

As shown in FIG. 3, the discharge unit D includes a piezoelectric element 300, a cavity 320 filled with ink, a nozzle N that is communicatively connected to the cavity 320, and a vibration plate 310. The piezoelectric element 300 is driven by the driving signal Vin, and thus, the discharge unit D discharges the ink within the cavity 320 from the nozzle N. The cavity 320 is a space partitioned by a cavity plate 340, a nozzle plate 330 in which the nozzle N is formed, and the vibration plate 310. The cavity 320 is communicatively connected to the reservoir 350 through the ink supply hole 360. The reservoir 350 is communicatively connected to one ink cartridge 48 through the ink inlet 370.

In the present embodiment, for example, a unimorph (monomorph) type shown in FIG. 3 is used as the piezoelectric element 300, but any type such as a bimorph type or a stacked type may be used as long as the piezoelectric element 300 is deformed to discharge a liquid such as ink. The piezoelectric element 300 includes a lower electrode 301, an upper electrode 302, and a piezoelectric member 303 provided between the lower electrode 301 and the upper electrode 302. Potential of the lower electrode 301 is set to be a predetermined reference potential VSS and the driving signal Vin is supplied to the upper electrode 302. Thus, a voltage is applied between the lower electrode 301 and the upper electrode 302, and thus, the piezoelectric element 300 is displaced in the Z-axis direction depending on the applied voltage. As a result, the piezoelectric element 300 is vibrated.

The vibration plate 310 is provided in an upper surface opening of the cavity plate 340, and the lower electrode 301 is coupled to the vibration plate 310. Thus, if the piezoelectric element 300 is vibrated by the driving signal Vin, the vibration plate 310 is also vibrated. A pressure within the cavity 320 is changed by the vibration of the vibration plate 310, and the ink filling in the cavity 320 is discharged through the nozzle N. In a case where the ink within the cavity 320 is reduced, the ink is supplied from the reservoir 350. The ink is supplied to the reservoir 350 from the ink cartridge 48 through the ink inlet 370.

Figure 4:
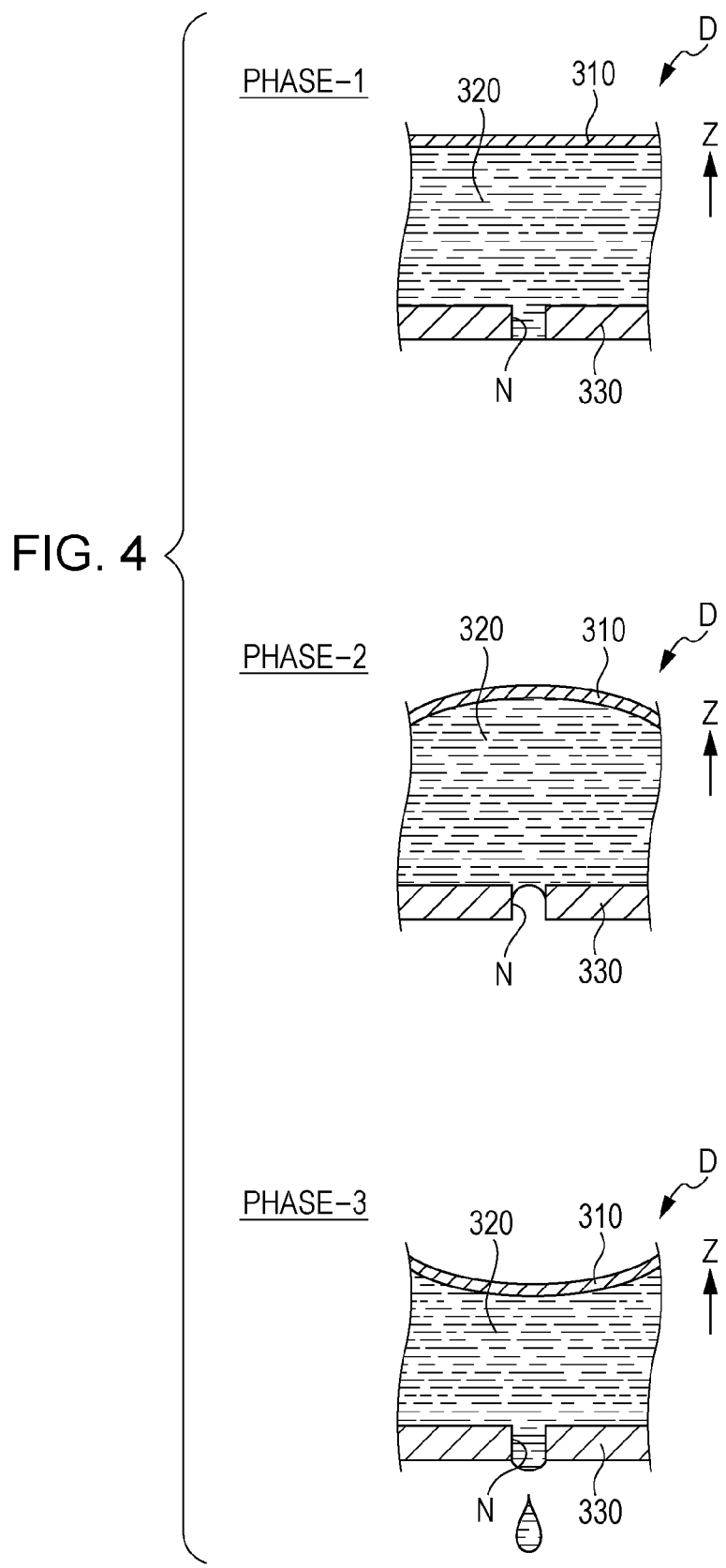
FIG. 4 is an explanatory diagram for describing a discharge operation of a discharge unit.

FIG. 4 is an explanatory diagram for describing a discharge operation of the ink from the discharge unit D.

As shown in FIG. 4, for example, in a Phase-1 state, the driving signal generating unit 31 deforms the piezoelectric element 300, and bends the vibration plate 310 of the discharge unit D in the +Z direction by changing the potential of the driving signal Vin supplied to the piezoelectric element 300 provided with the discharge unit D. Accordingly, in a Phase-2 state shown in FIG. 4, a volume of the cavity 320 of the discharge unit D is further increased than that in the Phase-1 state. Subsequently, for example, in the Phase-2 state, the driving signal generating unit 31 bends the vibration plate 310 in the −Z direction by changing the potential indicated by the driving signal Vin. Accordingly, as shown in a Phase-3 state shown in FIG. 4, the volume of the cavity 320 is drastically decreased. In this case, a part of the ink filling in the cavity 320 is discharged as an ink droplet from the nozzle N that is communicatively connected to the cavity 320 by a compressed pressure generated within the cavity 320.

Figure 5:
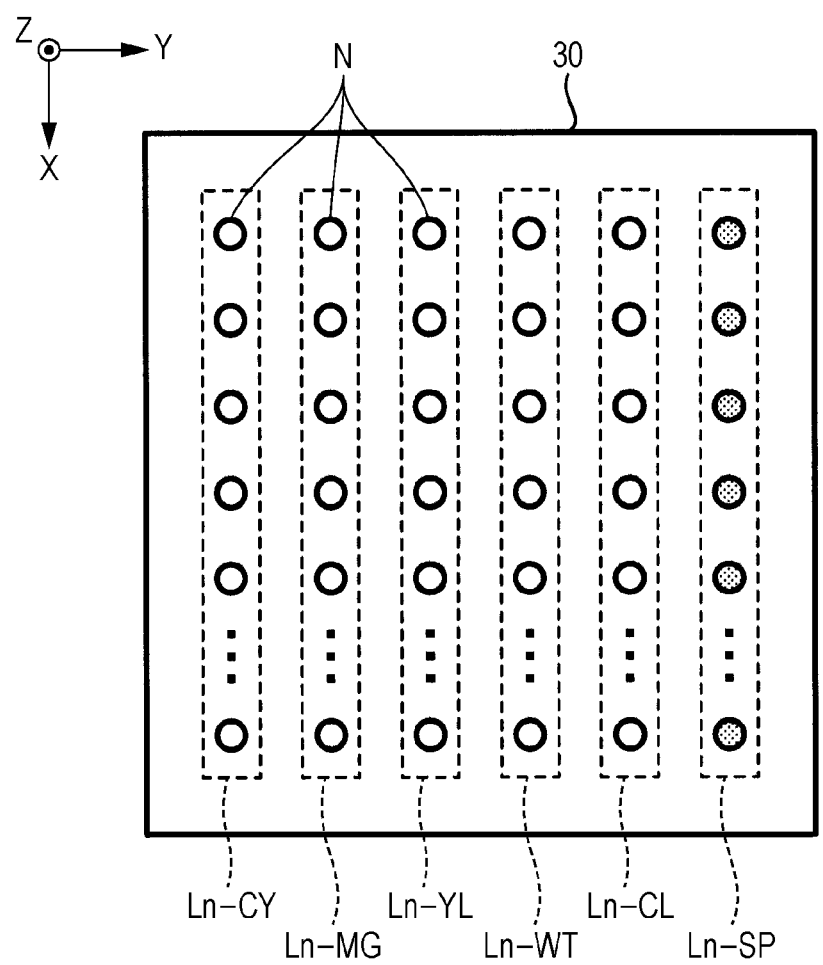
FIG. 5 is a plan view showing an arrangement example of nozzles of the recording head.

FIG. 5 is an explanatory diagram for describing an example of the arrangement of M number of nozzles N provided in the recording head 30 when the recording head 30 is viewed from the top in the +Z direction or the −Z direction.

As shown in FIG. 5, six nozzle arrays Ln each including a plurality of nozzles N are provided in the recording head 30. Specifically, 6 nozzle arrays Ln of nozzle arrays Ln-Cy, Ln-MG, Ln-YL, Ln-WT, Ln-CL, and Ln-SP are provided in the recording head 30.

Here, the nozzles N provided in the discharge unit D which discharge a cyan ink belongs to the nozzle array Ln-Cy, the nozzles N provided in the discharge unit D which discharges a magenta ink belongs to the nozzle array Ln-MG, the nozzles N provided in the discharge unit D which discharges a yellow ink belongs to the nozzle array Ln-YL, the nozzles N provided in the discharge unit D which discharges a white ink belongs to the nozzle array Ln-WT, the nozzles N provided in the discharge unit D which discharges a clear ink belongs to the nozzle array Ln-CL, and the nozzles N provided in the discharge unit D which discharges a support ink belongs to the nozzle array Ln-SP.

In the present embodiment, as shown in FIG. 5, a case where the plurality of nozzles N constituting each nozzle array Ln is arranged so as to be aligned in a line in the X-axis direction has been described. However, for example, the nozzles may be arranged in a so-called zigzag shape such that positions in the Y-axis direction are different between some nozzles N (for example, even-numbered nozzles N) of the plurality of nozzles N constituting each nozzles Ln, and the other nozzles (for example, odd-numbered nozzles N). In each nozzle array Ln, distances (pitches) between the nozzles N may be appropriately set depending on a printing resolution (dpi: dot per inch).

1.4. Driving Signal Generating Unit

Hereinafter, the configuration and operation of the driving signal generating unit 31 will be described with reference to FIGS. 6 and 7.

Figure 6:
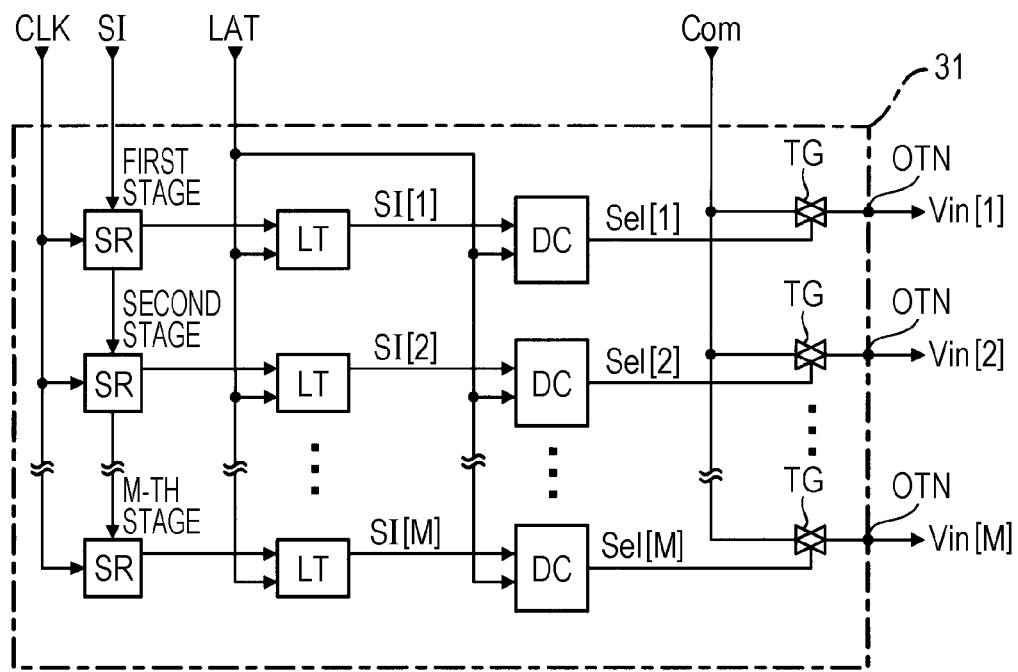
FIG. 6 is a block diagram showing the configuration of a driving signal generating unit.

FIG. 6 is a block diagram showing the configuration of the driving signal generating unit 31.

As shown in FIG. 6, the driving signal generating unit 31 includes M number of groups each including a shift register SR, a latch circuit LT, a decoder DC and a transmission gate TG so as to be in a one-to-one correspondence with M number of discharge units D. In the following description, the respective elements constituting M number of groups are sequentially referred to as a first stage, a second stage, . . . , and an M-th stage form the top in this drawing in some cases.

A clock signal CLK, a waveform designation signal SI, a latch signal LAT, and a driving waveform signal Com are supplied to the driving signal generating unit 31 from the forming control unit 6.

The waveform designation signal SI is a signal determined based on the structure forming data SD, and is a digital signal for designating whether or not the inks are discharged from the respective discharge units D. The waveform designation signal SI includes waveform designation signals SI[1] to SI[M]. Among these signals, the waveform designation signal SI[m] defines whether or not the ink from the discharge unit D[m] is discharged. Specifically, the waveform designation signal SI[m] represents any value of "1" for designating the discharge of as much ink as an ink amount necessary to form one dot and "0" for designating the non-discharge of the ink for the discharge unit D[m].

As shown in FIG. 6, M number of shift registers SR are connected to each other through a cascade connection. Each shift register SR temporarily retains the waveform designation signal SI[m] of the waveform designation signals SI (SI[1] to SI[M]) which corresponds to each stage. Specifically, for example, in a case where the waveform designation signals SI are serially supplied to M number of shift registers SR, the respective shift registers SR sequentially transmit the supplied waveform designation signals SI to the subsequent stage according to the clock signal CLK. In a case where the waveform designation signals SI are transmitted to all M number of shift registers SR, each shift register SR retains the waveform designation signal SI[m] of the waveform designation signals SI which corresponds to the their shift register.

For example, M number of latch circuits LT latch the waveform designation signals SI[m] which are retained in M number of shift registers SR and correspond to the respective stages all at once at a timing when the latch signal LAT rises.

However, An operation period of time which is a period of time when the three-dimensional object forming apparatus 1 performs the forming process includes a plurality of unit period of times Tu. Although the details are described below, the unit period of time Tu is defined by the latch signal LAT.

The forming control unit 6 supplies the waveform designation signals SI to the driving signal generating unit 31 at a timing earlier than the unit period of time Tu is started. The forming control unit 6 supplies the latch signals LAT to the respective latch circuits LT of the driving signal generating unit 31 such that the waveform designation signals SI[m] of the unit period of times Tu are latched.

The m-th stage decoder DC decodes the waveform designation signal SI[m] latched by the m-th stage latch circuit LT, and outputs a selection signal Sel[m] set to be any level of a high level (H level) and a low level (L level) in each unit period of time Tu.

Specifically, the m-th stage decoder DC outputs the selection signal Sel[m] set to be the H level in a case where the waveform designation signal SI[m] indicates a value ("1" in the present embodiment) for designating the discharge of the ink, and outputs the selection signal Sel[m] set to be the L level in a case where the waveform designation signal SI[m] indicates a value ("0" in the present embodiment) for designating the non-discharge of the ink.

The m-th stage transmission gate TG is turned on when the selection signal Sel[m] is set to be the H level, and is turned off when the selection signal Sel[m] is set to be the L level. The driving waveform signal Com is supplied to one end of each transmission gate TG. The other end of the m-th stage transmission gate TG is electrically connected to an m-th stage output end OTN.

In a case where the selection signal Sel[m] is set to be the H level and the m-th stage transmission gate TG is turned on, the driving waveform signal Com is supplied as the driving signal Vin[m] to the discharge unit D[m] from the m-th stage output terminal OTN.

In the present embodiment, the potential of the driving waveform signal Com at a timing when the transmission gate TG is switched to the OFF state from the ON state, that is, at a timing when the unit period of time Tu is started and is ended becomes the reference potential V0. Thus, in a case where the transmission gate TG is turned off, the potential of the output terminal OTN is maintained at the reference potential V0 by the capacity of the piezoelectric element 300 of the discharge unit D[m] or the like. However, in the following description, for the sake of convenient description, a case where the potential of the driving signal Vin[m] is maintained at the reference potential V0 in a case where the transmission gate TG is turned off is described in some cases.

As described above, the forming control unit 6 controls the driving signal generating unit 31 such that the driving signal Vin[m] is supplied to the discharge unit D[m] every unit period of time Tu. Accordingly, the discharge unit D[m]

discharges as much ink as an ink amount depending on the value indicated by the waveform designation signal SI[m] every unit period of time Tu, and can form the dot on the forming table 45.

Figure 7:
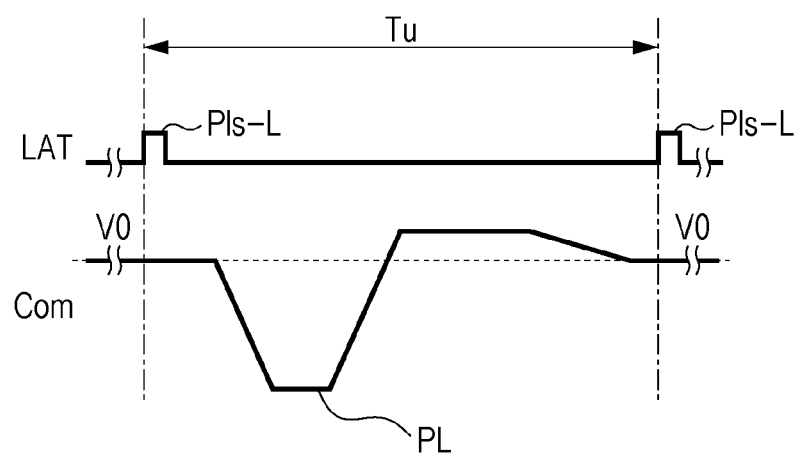
FIG. 7 is a timing chart showing a waveform of a driving waveform signal.

FIG. 7 is a timing chart for describing various signals from the forming control unit 6 to the driving signal generating unit 31 in each unit period of time Tu.

As shown in FIG. 7, the latch signal LAT has a pulse waveform Pls-L, and the unit period of time Tu is defined by the pulse waveform Pls-L. Although not shown, the forming control unit 6 synchronizes the waveform designation signal SI with the clock signal CLK every unit period of time Tu, and serially supplies the synchronized signals to the driving signal generating unit 31.

As shown in FIG. 7, the driving waveform signal Com according to the present embodiment is set to be the reference potential V0 at a timing when each unit period of time Tu is started and is ended. The driving waveform signal Com according to the present embodiment has a waveform PL which is changed to a potential lower than the reference potential V0 after the unit period of time Tu is started and then is changed to a potential higher than the reference potential V0. In a case where the driving signal Vin[m] having the waveform PL is supplied to the discharge unit D[m], the waveform PL is adjusted such that as much ink as an ink amount required to form a dot having a size for satisfying one voxel Vx is discharged from the discharge unit D[m].

Here, the voxel Vx is a virtual cuboid which has a predetermined thickness ΔZ and has a predetermined shape. In the present embodiment, each voxel Vx is associated with any ink of the six kinds of inks stored in the six ink cartridges 48. Specifically, each voxel Vx is associated with any ink color of the six kinds of inks. As mentioned above, the respective dots constituting the three-dimensional object Obj are formed using any ink of the five kinds of forming inks, and the respective dots constituting the support section are formed using the support ink. The three-dimensional object Obj and the support section are formed as an aggregate of dots formed in the respective voxels Vx.

Thus, the shape and color of the three-dimensional object Obj can be approximately represented as an aggregate of voxels Vx by using a plurality of voxels Vx to which color corresponding to any one of the five kinds of forming inks is given. Similarly, the shape of the support section can be approximately represented by using a plurality of voxels Vx to which color corresponding to the forming ink is given. Although the details are described below, the structure forming data SD according to the present embodiment approximately represents the shape and color of the structure LY as the aggregate of voxels Vx.

In the present specification, the concept of the cuboid is described as including the concept of a cube. In the following description, the voxel Vx corresponding to the structure LY[q] is referred to as a voxel Vx[q] in some cases.

In a case where the waveform designation signal SI[m] indicates "1" in the unit period of time Tu, that is, in a case where the selection signal Sel[m] indicates the H level, the driving signal generating unit 31 supplies the driving waveform signal Com having the waveform PL as the driving signal Vin[m] to the discharge unit D[m]. Accordingly, the ink is discharged from the discharge unit D[m], and a dot is formed so as to fill one voxel Vx with the discharged ink.

In a case where the waveform designation signal SI[m] indicates "0" in the unit period of time Tu, that is, in a case where the selection signal Sel[m] indicates the L level, the driving signal generating unit 31 supplies the driving waveform signal Com set to be the reference potential V0 as the driving signal Vin[m] to the discharge unit D[m]. In this case, the ink is not discharged from the discharge unit D[m], and the dot is not formed (recording is not performed).

2. Outline of Forming Data Generating Process and Forming Process

Hereinafter, the outline of the structure forming data generating process and the forming process performed by the three-dimensional object forming system 100 will be described with reference to FIGS. 8 and 9.

Figure 8:
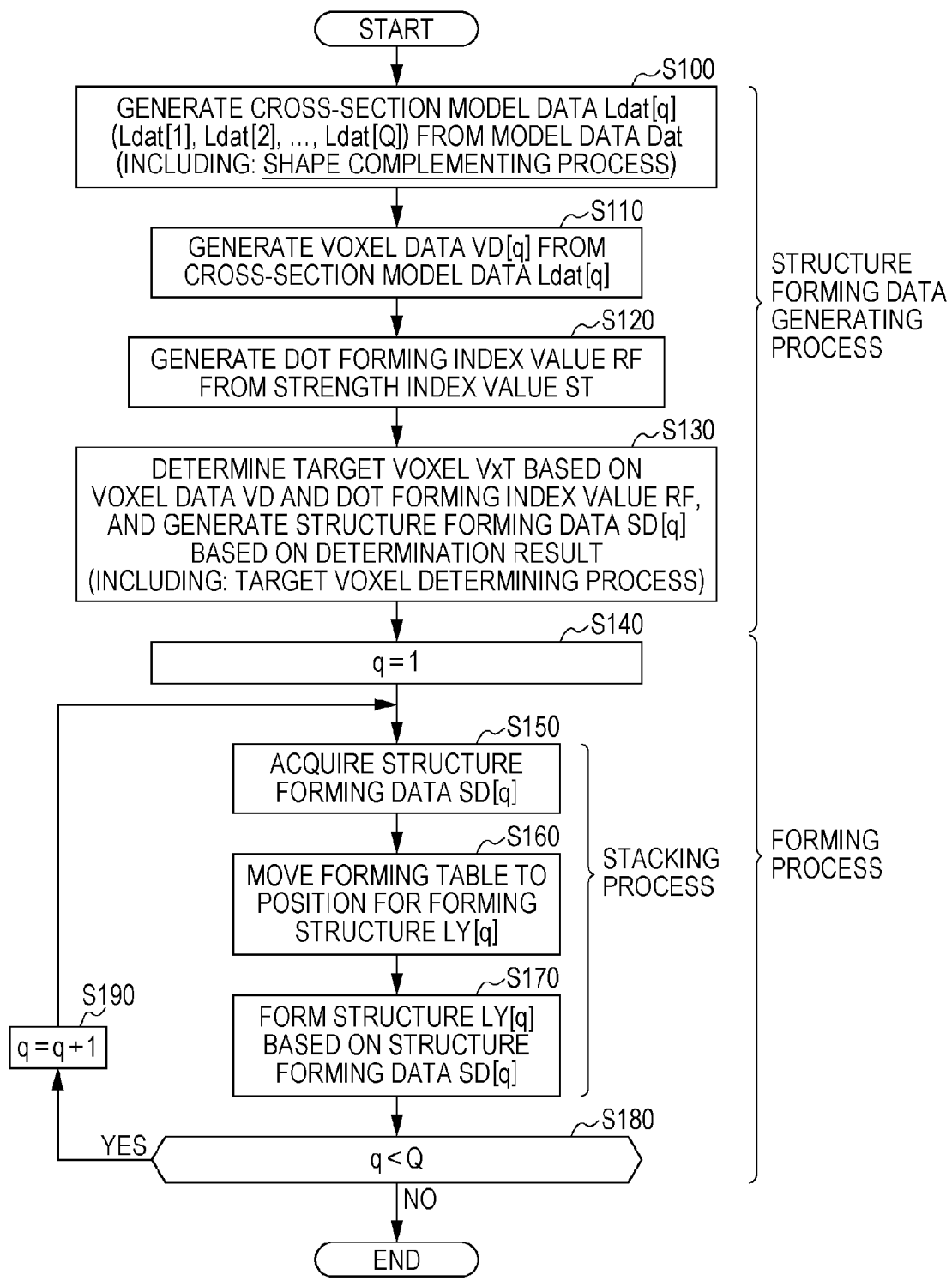
FIG. 8 is a flowchart showing a structure forming data generating process and a forming process.

FIG. 8 is a flowchart showing an example of the operation of the three-dimensional object forming system 100 in a case where the structure forming data generating process and the forming process are performed. FIG. 9 is a flow of forming the three-dimensional object Obj, and specifically is an explanatory diagram for schematically describing the relationship between data such as the model data Dat and the structure forming data SD and a product such as the structure LY and the three-dimensional object Obj formed by the three-dimensional object forming apparatus 1 in a case where the three-dimensional object Obj is formed.

If the model data Dat output from the model data generating unit 92 is acquired, the structure forming data generating unit 93 of the host computer 9 starts the structure forming data generating process shown in steps S100 to S130 of FIG. 8.

As shown in FIG. 8, if the structure forming data generating process is started, the structure forming data generating unit 93 generates cross-section model data Ldat based on the model data Dat output from the model data generating unit 92 (S100).

Figure 9:
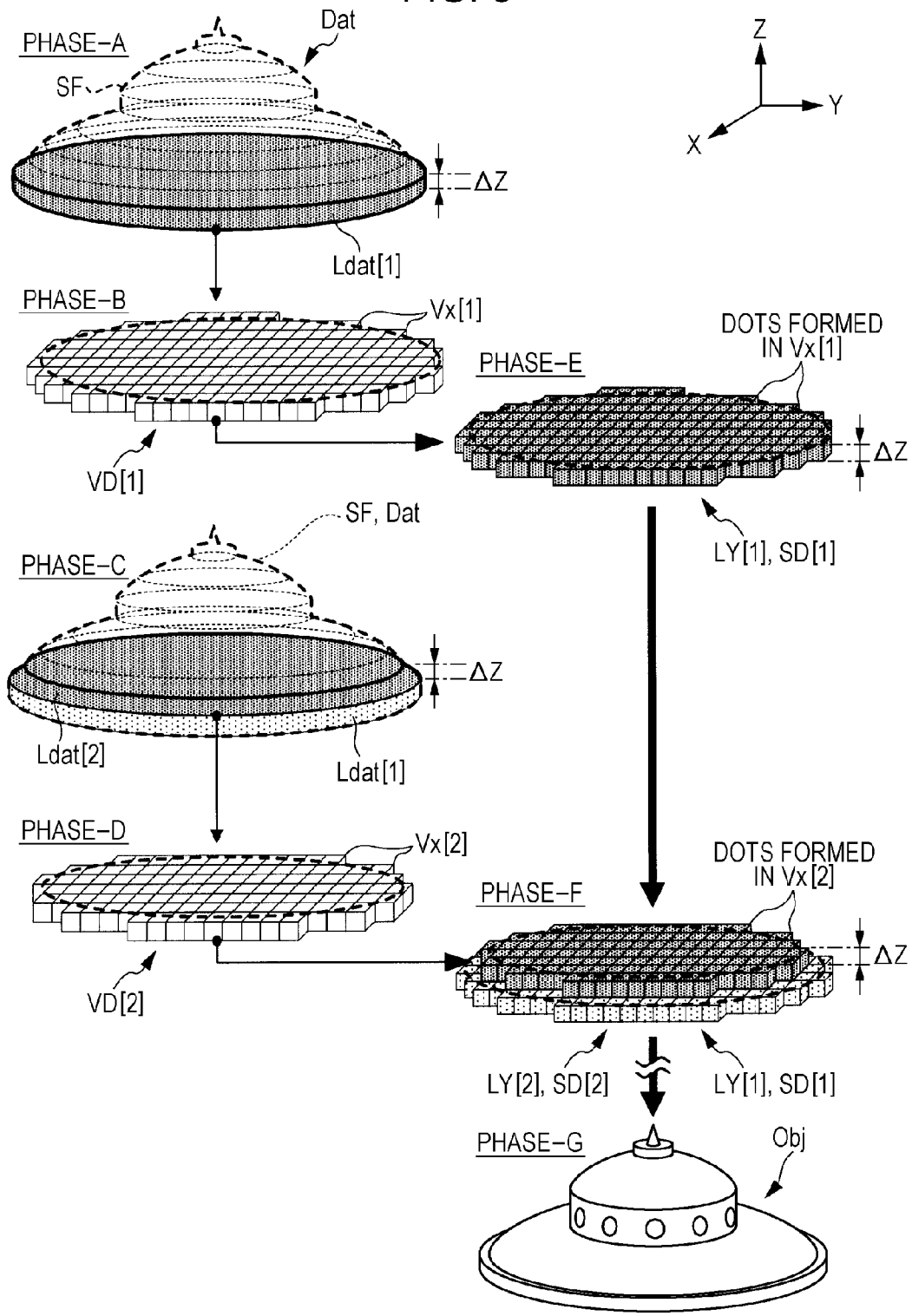
FIG. 9 is a diagram for describing the forming of the three-dimensional object by means of the three-dimensional object forming system.

Specifically, in step S100, the structure forming data generating unit 93 generates cross-section model data items Ldat[1] to Ldat[Q] which is in a one-to-one correspondence with the structures LY[1] to LY[Q] each having a predetermined thickness ΔZ as in a Phase-A state and a Phase-C state shown in FIG. 9 by slicing the model of the three-dimensional object Obj indicated by the model data Dat into models each having a predetermined thickness ΔZ. The Phase-A state illustrated in FIG. 9 is a case where the cross-section model data Ldat[1] corresponding to the structure LY[1] is generated, and a Phase-C state illustrated in FIG. 9 is a case where the cross-section model data Ldat[2] corresponding to the structure LY[2] is generated.

Here, the cross-section model data Ldat[q] is data indicating the shape and color of the model that represents the structure LY[q]. Although it has described in the present embodiment that the cross-section model data Ldat indicates the shape and color of a three-dimensional cross section body acquired by slicing the model having the three-dimensional shape indicated by the model data Dat, the invention is not limited to such an aspect, and the cross-section model data Ldat may include at least information indicating the shape and color of a two-dimensional cross section when the model having the three-dimensional shape indicated by the model data Dat is sliced.

However, as stated above, the model data Dat according to the present embodiment designates the shape (the shape of the contour) of the external surface SF of the model of the three-dimensional object Obj. Thus, in a case where the shape indicated by the model data Dat is faithfully formed, the formed three-dimensional object Obj has a hollow shape having only the contour having no thickness. However, in a case where the three-dimensional object Obj is formed, it is necessary to consider the strength of the three-dimensional object Obj. That is, in a case where the three-dimensional object Obj is formed, it is necessary for a part or all of the inside of three-dimensional object Obj to have a solid structure such that the strength necessary for the three-dimensional object Obj is obtained. Thus, in step S100, the structure forming data generating unit 93 according to the present embodiment complements the model of the three-dimensional object Obj indicated by the model data Dat such that at least a part of the hollow portion positioned on an inner side than the external surface SF has the solid structure, and generates the cross-section model data Ldat.

In the following description, a process of complementing the hollow portion of the model indicated by the model data Dat and generating the cross-section model data Ldat acquired by allowing at least a part of the hollow portion to have the solid structure, which is performed during the structure forming data generating process, is referred to as a shape complementing process. In the following description, the complemented model of the three-dimensional object Obj indicated by the cross-section model data Ldat, that is, the model complemented by allowing at least a part of the hollow portion of the three-dimensional object Obj indicated by the model data Dat to have the solid structure is referred to as a complementary model in some cases. The details of the shape complementing process are described below.

As shown in FIG. 8, the structure forming data generating unit 93 generates voxel data VD[q] based on the cross-section model data Ldat[q] (S110).

Specifically, in step S110, the structure forming data generating unit 93 generates voxel data VD represented by discretizing the shape and color of a cross-section body of the complementary model of the three-dimensional object Obj represented by the cross-section model data Ldat[q] Vx into a grid pattern for every voxel, as in the Phase-B and Phase-D states shown in FIG. 9. That is, the structure forming data generating unit 93 generates the voxel data VD[q] which is data acquired by approximately representing the shape and color of the cross-section body of the complementary model of the three-dimensional object Obj represented by the cross-section model data Ldat[q] as the aggregate of voxels Vx. The Phase-B state shown in FIG. 9 is a case where the voxel data VD[1] which represents the aggregate of voxels Vx acquired by approximating the cross-section body indicated by the cross-section model data Ldat[[1] is generated, and a Phase-D state shown in FIG. 9 is a case where the voxel data VD[2] which represents the aggregate of voxels Vx acquired by approximating the cross-section body indicated by the cross-section model data Ldat[[2] is generated.

As shown in FIG. 8, the structure forming data generating unit 93 generates the dot forming index value RF based on the strength index value ST (S120).

Specifically, in step S120, the structure forming data generating unit 93 calculates the dot forming rate α necessary for the three-dimensional object Obj to obtain the strength indicated by the strength index value ST, and outputs the calculated dot forming rate as the dot forming index value RF corresponding to the calculation result.

For example, in a case where the strength index value ST is a value indicating the ink amount capable of being used to form the three-dimensional object Obj, the structure forming data generating unit 93 may calculate the dot forming index value RF based on the available ink amount, and the ink amount necessary to satisfy the volume of the three-dimensional object Obj. For example, in a case where the strength index value ST is a value indicating the level of the strength necessary for the three-dimensional object Obj, the structure forming data generating unit 93 may calculate the ink amount necessary to obtain the strength based on the shape and size of the three-dimensional object Obj, and may calculate the dot forming index value RF based on the calculation result.

Subsequently, as shown in FIG. 8, the structure forming data generating unit 93 generates the structure forming data SD based on the voxel data VD and the dot forming index value RF (S130).

Specifically, in step S130, the determination unit 95 of the structure forming data generating unit 93 initially performs the target voxel determining process of determining the target voxel VxT from the aggregate of voxels Vx indicated by the voxel data VD[q] depending on the dot forming index value RF. Here, the target voxel VxT is a voxel Vx in which the dot is formed. In the following description, the voxel Vx other than the target voxel VxT, that is, the voxel Vx in which the dot is not formed is referred to as a non-target voxel VxH in some cases. The details of the target voxel determining process are described below.

Thereafter, in step S130, the structure forming data generating unit 93 generates the structure forming data SD[q] depending on the determination result in the target voxel determining process. A Phase-e state shown in FIG. 9 is a case where the structure forming data SD[1] is generated based on the voxel data VD[1] and the structure LY[1] corresponding to the structure forming data SD[1] is formed, and a Phase-F state shown in FIG. 9 is a case where the structure forming data SD[2] is generated based on the voxel data VD[2] and the structure LY[2] corresponding to the structure forming data SD[2] is formed.

As mentioned above, the structure forming data SD[q] is data for designating the shape and color of the structure LY[q]. More specifically, the structure forming data SD[q] is data which designates the target voxel VxT which is the voxel Vx in which the dot is formed among the aggregate of voxels Vx indicated by the voxel data VD[q] and designates the color of the dot to be formed in each target voxel VxT. In the present embodiment, the structure forming data generating unit 93 designates the color of the dot to be formed in the target voxel VxT by the kind of ink (the color of the ink) for forming the dot.

In the Phase-E and the Phase-F of FIG. 9, for the sake of convenient description, a case where the dots are formed in all the voxels Vx constituting the structure forming data SD[q], that is, a case where all the plurality of voxels Vx constituting the structure forming data SD[q] are the target voxel VxT is illustrated.

As described above, the structure forming data generating unit 93 generates the structure forming data SD based on the model data Dat and the strength index value ST by performing the structure forming data generating process of steps S100 to S130.

The three-dimensional object forming system 100 performs the forming process shown by steps S140 to S190 of FIG. 8 after the structure forming data generating process is performed.

The forming process is a process performed by the three-dimensional object forming apparatus 1 under the control of the forming control unit 6, and is a process started after the structure forming data SD generated by the host computer 9 is acquired by the three-dimensional object forming apparatus 1 and is stored in the storage unit 60.

As shown in FIG. 8, if the forming process is started, the forming control unit 6 sets a variable q indicating the number of times the stacking process is performed to be a value "1" (S140). Subsequently, the forming control unit 6 acquires the structure forming data SD[q] generated by the structure forming data generating unit 93 from the storage unit 60 (S150). The forming control unit 6 controls the elevation mechanism driving motor 71 such that the forming table 45 is moved to a position for forming the structure LY[q] (S160). The position of the forming table 45 for forming the structure LY[q] may be any position as long as the ink discharged from the head unit 3 can be shot to a dot forming position (voxel Vx[q]) designated by the structure forming data SD[q]. For example, in step S160, the forming control unit 6 may control the position of the forming table 45 such that the distance between the structure LY[q] and the head unit 3 in the Z-axis direction becomes constant. In this case, for example, the forming control unit 6 may move the forming table 45 in the −Z direction by only the predetermined thickness $\Delta Z$ until the forming of the structure LY[q+1] in the (q+1)-th stacking process is started after the structure LY[q] is formed in the q-th stacking process.

Thereafter, the forming control unit 6 controls the operations of the head unit 3, the position changing mechanism 7 and the curing unit 61 (hereinafter, the head unit 3, the position changing mechanism 7 and the curing unit 61 are referred to as "the head unit 3 and the like") such that the structure LY[q] corresponding to the structure forming data SD[q] is formed (S170).

Specifically, in step S170, the forming control unit 6 initially controls the operation of the head unit 3 such that the waveform designation signal SI is generated based on the structure forming data SD[q] and the forming ink or the support ink is discharged by the generated waveform designation signal SI. In step S170, the forming control unit 6 controls the operation of the curing unit 61 such that the discharged ink is cured and the dot is formed. As can be apparent from FIG. 9, the structure LY[1] is formed on the forming table 45, and the structure LY[q+1] is formed on the structure LY[q].

The process of steps S150 to S170 described above corresponds to the stacking process. The three-dimensional object forming apparatus 1 forms the structure LY[q] corresponding to the structure forming data SD[q] by performing the stacking process shown by steps S150 to S170. In FIG. 9, a case where the structure LY[1] based on the structure forming data SD[1] is formed in the Phase-E state and the structure LY[2] based on the structure forming data SD[2] is formed in the Phase-F state is illustrated.

Subsequently, the forming control unit 6 determines whether or not the variable q satisfies "q<Q" (S180). In a case where the determination result in step S180 is positive, the forming control unit 6 adds "1" to the variable q, and then proceeds to the process of step S150 (S190). In a case where the determination result in step S180 is negative, that is, in a case where the variable q reaches "q=Q", the forming control unit 6 ends the forming process.

As stated above, the three-dimensional object forming apparatus 1 forms the three-dimensional object Obj as in a Phase-G state illustrated in FIG. 9 by sequentially stacking the structures LY[1] to LY[Q] corresponding to the structure forming data items SD[1] to SD[Q] as in the Phase-E state and the Phase-F state illustrated in FIG. 9.

As described above, the three-dimensional object forming system 100 generates the structure forming data items SD[1] to SD[Q] based on the model data Dat and the strength index value ST by performing the structure forming data generating process shown by steps S100 to S130 of FIG. 8 in the structure forming data generating unit 93. The three-dimensional object forming system 100 forms the three-dimensional object Obj such that the shape and color of the model indicated by the model data Dat is reproduced by performing the forming process shown by steps S140 to S190 of FIG. 8 under the control of the forming control unit 6 in the three-dimensional object forming apparatus 1.

FIG. 8 is merely an example of the flow of the structure forming data generating process and the forming process. For example, in FIG. 8, after the structure forming data generating process is ended, the forming process is started. However, the invention is not limited to such an aspect, and the forming process may be started before the structure forming data generating process is ended. For example, in a case where the structure forming data SD[q] is formed in the structure forming data generating process, the forming process (that is, the q-th stacking process) of forming the structure LY[q] corresponding to the structure forming data SD[q] may be performed without waiting to generate the next structure forming data SD[q+1].

However, in the example shown in FIG. 9, the voxels Vx[1] constituting the structure LY[1] formed in the first stacking process are present in the −Z direction of the voxels Vx[2] constituting the structure LY[2] formed in the second stacking process. However, the voxels Vx[1] are not present under the voxels Vx[2] depending on the shape of the three-dimensional object Obj in some cases. In this case, even though the dots are attempted to be formed in the voxels Vx[2], the dots are formed in positions lower than the positions where the dots are originally formed in some cases. Thus, in a case where "q≥2" and in a case where the voxels Vx[q−1] are not presented under the voxels Vx[q], in order to form the dots in the positions corresponding to the voxels Vx[q], it is necessary to provide the support section for supporting the dot formed in the voxel Vx[q] in at least a part under the voxels Vx[q].

Thus, in the present embodiment, it is assumed that the cross-section model data Ldat includes data that determines the shape of the support section required when the three-dimensional object Obj is formed in addition to the model that determines the shape of the three-dimensional object Obj. That is, in the present embodiment, both a portion of the three-dimensional object Obj to be formed in the q-th stacking process and a portion of the support section to be formed in the q-th stacking process are included in the structure LY[q]. In other words, the structure forming data SD[q] includes data acquired by representing the shape and color of the portion of the three-dimensional object Obj which is formed as the structure LY[q] as the aggregate of voxels Vx[q] and data acquired by representing the shape of the portion of the support section formed as the structure LY[q] as the aggregate of voxels Vx[q].

In step S100, the structure forming data generating unit 93 according to the present embodiment determines whether or not it is necessary to provide the support section for forming the voxel Vx[q] based on the model data Dat. In step S100, in a case where the determination result is positive, the structure forming data generating unit 93 generates the cross-section model data Ldat such that the support section is provided in addition to the three-dimensional object Obj.

The support section is removed after the three-dimensional object Obj is formed. Thus, it is preferable that the support section is made of a material capable of being easily removed after the three-dimensional object Obj is formed, for example, a water-soluble ink or an ink having a melting point lower than that of the ink for forming the three-dimensional object Obj.

3. Shape Complementing Process

As stated above, in step S100 of FIG. 8, the structure forming data generating unit 93 performs the shape complementing process of complementing a part or all of the hollow portion of the model of the three-dimensional object Obj indicated by the model data Dat, generating the complementary model of the three-dimensional object Obj in which at least a part of the inside positioned on the inner side than the external surface SF of the model of the three-dimensional object Obj has the solid structure, and generating the cross-section model data items Ldat indicating the cross-section body of the complementary model.

Hereinafter, the structure of the complementary model of the three-dimensional object Obj and the shape complementing process of generating the complementary model will be described with reference to FIGS. 10A and 10B.

Figure 10A:
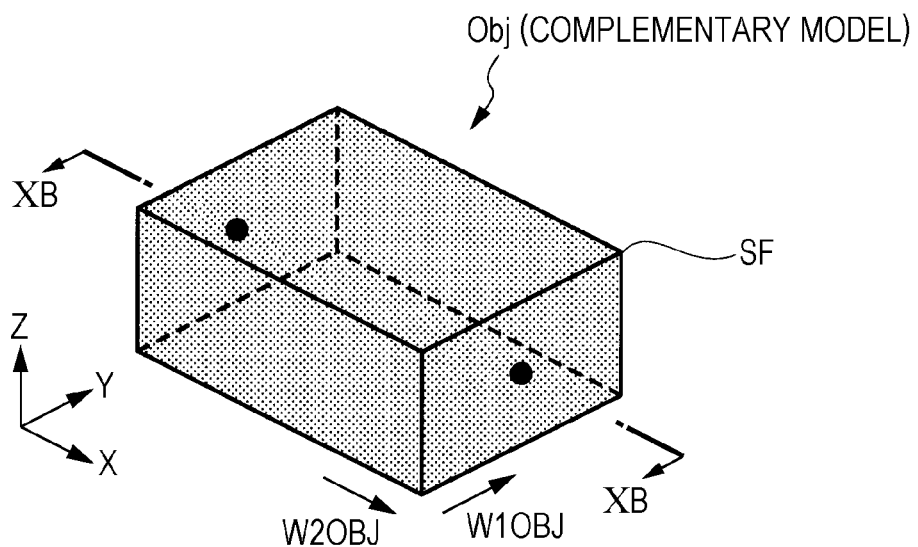
FIG. 10A is an explanatory diagram for describing a complementary model of the three-dimensional object.

FIG. 10A is a perspective view of the complementary model of the three-dimensional object Obj. In FIG. 10A, for the sake of convenient illustration, it is assumed that a three-dimensional object Obj having a cuboid shape different form that of FIG. 9 is formed. The model of the three-dimensional object Obj indicated by the model data Dat and the complementary model of the three-dimensional object Obj generated by the shape complementing process have the same shape in appearance.

Figure 10B:
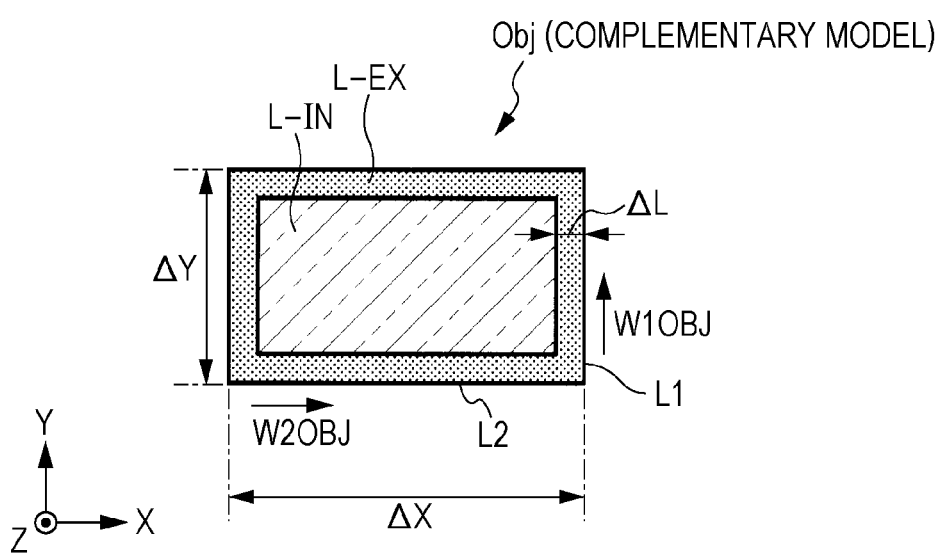
FIG. 10B is an explanatory diagram for describing the complementary model of the three-dimensional object.

FIG. 10B is a sectional view when the complementary model of the three-dimensional object Obj shown in FIG. 10A is taken along a straight XB-XB and is cut by a plane parallel to an X axis and a Y axis. As shown in FIG. 10B, the complementary model of the three-dimensional object Obj includes an outline section L-EX which is a portion having a thickness ΔL which extends inwards from the external surface SF of the model and an inside section L-IN (an example of an "inside of the three-dimensional object") which is a portion which positioned on an inner side than the outline section L-EX. In order to generate the complementary model of the three-dimensional object Obj, the structure forming data generating unit 93 performs the shape complementing process.

Specifically, in the shape complementing process, the structure forming data generating unit 93 determines the portion having the thickness ΔL which extends inward from the external surface SF of the model of the three-dimensional object Obj indicated by the model data Dat, as the outline section L-EX as shown in FIG. 10B. In the shape complementing process, the structure forming data generating unit 93 determines the portion which is positioned on the inner side than the outline section L-EX of the model of the three-dimensional object Obj indicated by the model data Dat, as the inside section L-IN. Accordingly, the structure forming data generating unit 93 generates the complementary model of the three-dimensional object Obj including the outline section L-EX and the inside section L-IN. The structure forming data generating unit 93 generates the cross-section model data items Ldat indicating the cross-section bodies of the complementary model of the three-dimensional object Obj by slicing the complementary model of the three-dimensional object Obj.

The three-dimensional object Obj is the aggregate of dots formed based on the complementary model of the three-dimensional object Obj generated by the shape complementing process. That is, the three-dimensional object Obj is divided into a portion corresponding to the outline section L-Ex of the complementary model from a portion corresponding to the inside section L-IN of the complementary model. Hereinafter, the portion corresponding to the outline section L-EX of the complementary model of the three-dimensional object Obj is simply referred to as the outline section L-EX of the three-dimensional object Obj, and the portion corresponding to the inside section L-IN of the complementary model of the three-dimensional object Obj is simply referred to as the inside section L-IN of the three-dimensional object Obj.

Here, the outline section L-EX of the three-dimensional object Obj is a portion which includes the external surface SF of the three-dimensional object Obj and represents the external appearance of the three-dimensional object Obj, and is a portion used to given color to the three-dimensional object Obj. The outline section L-EX of the three-dimensional object Obj is formed by the forming ink including the color ink.

In the present embodiment, the portion of the complementary model corresponding to the outline L-EX of the three-dimensional object Obj approximates as the aggregation of target voxels VxT. That is, in the present embodiment, it is assumed that the aggregation of voxels Vx approximating the outline section L-EX of the complementary model includes the target voxels VxT which are the voxels Vx in which the dots are formed, and does not include the non-target voxels VxH.

The inside section L-IN of the three-dimensional object Obj is the portion for obtaining the strength of the three-dimensional object Obj. The inside section L-IN of the three-dimensional object Obj may be formed by an arbitrary forming ink, or may be formed by an ink which satisfies one or both of two requirements in which an ink has inconspicuous color and an ink is capable of obtaining high strength in a case where the ink is cured. Here, the ink having inconspicuous color is, for example, the achromatic color ink or the clear ink. For example, the ink capable of obtaining the high strength is an ink such that the clear ink having a small amount of color material components. In the present embodiment, for example, it is assumed that the inside section L-IN is formed by the clear ink.

In the present embodiment, the aggregate of voxels Vx corresponding to the inside section L-IN of the three-dimensional object Obj includes the target voxels VxT and the non-target voxels VxH. Specifically, the determination unit 95 classifies the respective voxels Vx included in the inside section L-IN as any one of the target voxels VxT and the non-target voxels VxH by performing the target voxel determining process. In other words, the determination unit 95 determines the target voxels VxT from the aggregate of voxels Vx corresponding to the inside section L-IN of the three-dimensional object Obj and determines the dot arrangement of the inside section L-IN of the three-dimensional object Obj by performing the target voxel determining process.

Hereinafter, the voxel Vx for representing the outline section L-EX of the complementary model among the voxels Vx indicated by the voxel data VD is referred to an external voxel Vx-EX. Particularly, the external voxel Vx-EX corresponding to the cross-section model data Ldat[q] is assigned a notation q, and is represented as an external voxel Vx-EX[q] in some cases. As can be apparent from the above-mentioned description, all the external voxels Vx-EX according to the present embodiment are classified as the target voxels VxT.

Hereinafter, the voxel Vx for representing the inside section L-IN of the complementary model among the voxels Vx indicated by the voxel data VD is an internal voxel Vx-IN. The internal voxel Vx-IN corresponding to the cross-section model data Ldat[q] is assigned a notification q, and is represented as an internal voxel Vx-IN[q] in some cases. As can be apparent from the above-mentioned description, the respective internal voxels Vx-IN according to the present embodiment are classified as any one of the target voxels VxT and the non-target voxels VxH in the target voxel determining process.

However, although it has been described in the present embodiment that the outline section L-EX of the complementary model of the three-dimensional object Obj is determined to have a constant thickness ΔL, the present embodiment is merely an example. For example, the outline section L-EX of the complementary model of the three-dimensional object Obj may have a thickness capable of obtaining the minimum strength to the extent that the three-dimensional object Obj does not collapse due to its weight, or the thickness of the outline section L-EX may not be constant.

In the present embodiment, as shown in FIGS. 10A and 10B, on the cut plane when the three-dimensional object Obj is cut by the plane perpendicular to the stacking direction, a direction which is perpendicular to the stacking direction and in which a width of the cross section becomes the narrowest is determined as a direction W1OBJ (an example of a "first direction"). In the present embodiment, it is assumed that the model data generating unit 92 provided in the host computer 9 determines the direction W1OBJ when the model data Dat is generated. However, the structure forming data generating unit 93 may determine the direction W1OBJ based on the model data Dat. For the sake of convenient description, a direction which is perpendicular to the stacking direction and crosses the direction W1OBJ is determined as a direction W2OBJ (an example of a "second direction").

In the example of FIGS. 10A and 10B, on the cut plane of the three-dimensional object Obj cut by an XY plane crossing the +Z direction which is the stacking direction, a width ΔY of a side L1 in an extending direction is less than a width in another direction, for example, a width ΔX of a side L2 in an extending direction. Thus, in the example of FIGS. 10A and 10B, the extending direction of the side L1 is determined as the direction W1OBJ. In the example shown in FIGS. 10A and 10B, for example, the extending direction of the side L2 is determined as the direction W2OBJ.

In the example of FIGS. 10A and 10B, the three-dimensional object Obj is disposed in a posture set such that the side L1 and the Y axis are parallel and the side L2 and the X axis are parallel. Accordingly, in the example shown in FIGS. 10A and 10B, the direction W1OBJ is the +Y direction, and the direction W2OBJ is the +X direction.

It is assumed that the three-dimensional object forming system 100 according to the present embodiment can freely determine a posture in a rotation direction around the Z axis among the postures of the three-dimensional object Obj when viewed from the three-dimensional object forming apparatus 1 in a case where the three-dimensional object forming apparatus 1 forms the three-dimensional object Obj. That is, the structure forming data generating unit 93 according to the present embodiment can generate the voxel data VD and the structure forming data SD such that the posture of the three-dimensional object Obj indicated by the structure forming data items SD[1] to SD[Q] becomes a posture acquired by rotating the posture of the model of the three-dimensional object Obj indicated by the model data Dat around the Z axis.

Accordingly, although it has been described in FIGS. 10A and 10B that the direction W1OBJ becomes the +Y direction, the direction W1OBJ is also rotated within the XY plane according to the rotation in a case where the three-dimensional object Obj becomes the posture acquired by rotating the posture shown in FIGS. 10A and 10B around the Z axis.

4. Target Voxel Determining Process

The structure forming data generating unit 93 performs the target voxel determining process of determining the target voxels VxT in step S130 of FIG. 8 of the structure forming data generating process.

As stated above, the aggregate of voxels Vx that appropriates the outline section L-EX includes only the target voxels VxT and does not include the non-target voxels VxH. In other words, in the outline section L-EX, the respective voxels Vx are the target voxels VxT, and do not need to be classified as any one type of the target voxels VxT and the non-target voxels VxH. Thus, it is assumed that the target voxel determining process according to the present embodiment is performed on only the inside section L-IN and is not performed the outline section L-EX. That is, the target voxel determining process according to the present embodiment is a process of determining the target voxels VxT in the inside section L-IN, in other words, a process of determining the internal structure of the three-dimensional object Obj.

Figure 11:
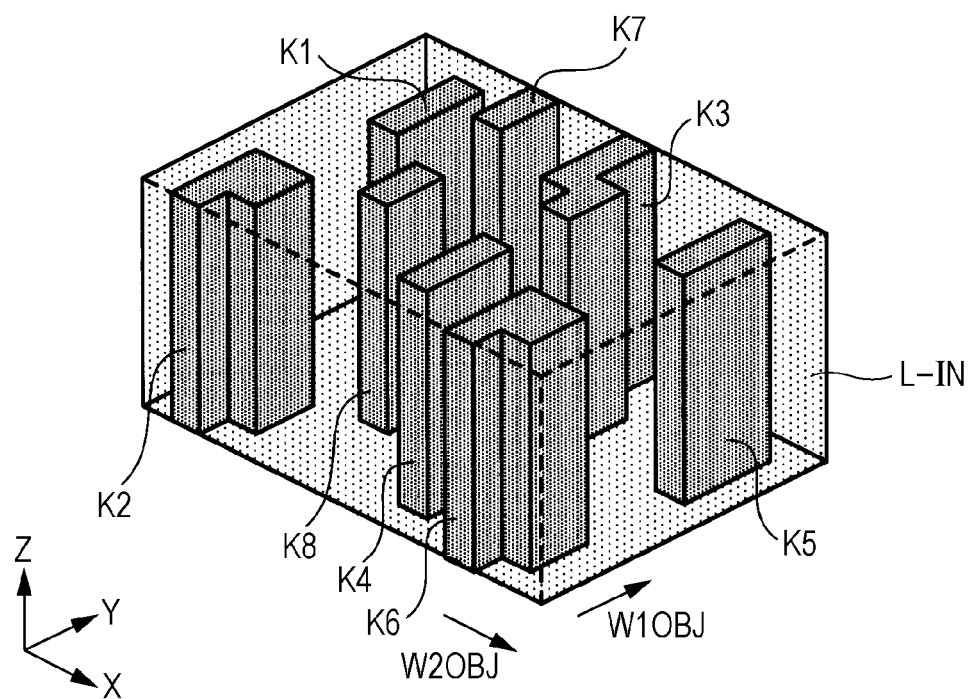
FIG. 11 is a schematic perspective view of an inside section of the three-dimensional object.

FIG. 11 is a perspective view showing an example of the structure of the inside section L-IN of the three-dimensional object Obj (the internal structure of the three-dimensional object Obj) which is determined by the target voxel determining process according to the present embodiment. In FIG. 11, only the inside section L-In of the three-dimensional object Obj is transparently represented.

In the target voxel determining process according to the present embodiment, as shown in FIG. 11, in the inside section L-IN of the three-dimensional object Obj, the target voxels VxT are determined such that one or a plurality of pillars K which extends in the Z-axis direction (an example of a "predetermined direction") is provided. More specifically, in the target voxel determining process according to the present embodiment, the number of pillars K provided in the inside section L-IN of the three-dimensional object Obj, the shapes of the pillars K, and the positions of the pillars K are determined. In FIG. 11, for example, a case where 8 pillars K1 to K8 are provided in the inside section L-IN of the three-dimensional object Obj is shown.

In the present embodiment, in order to easily form the pillars K, it is assumed that the pillars K which extend in the Z-axis direction are formed, in other words, the pillars K which extend in the direction in which the structures LY[1] to LY[Q] are stacked are formed. However, the invention is not limited to such an aspect, and the "predetermined direction" as the extending direction of the pillar K may be different from the Z-axis direction.

Although the details are described below, in a case where the three-dimensional object Objt is cut by the XY plane, the internal structure of the three-dimensional object Obj is determined in the target voxel determining process according to the present embodiment such that the number of pillars K, of one or the plurality of pillars K formed in the inside section L-IN, which have the cross section of which the length in the direction W1OBJ is greater than the length in the direction W2OBJ is greater than the number of pillars K having the cross section of which the length in the direction W2OBJ is greater than the length in the direction W1OBJ.

For example, in FIG. 11, in the inside section L-IN of the three-dimensional object Obj, a case where the pillars K having the cross section long in the direction W1OBJ are 8 pillars K1 to K8, whereas there is no pillar K having the cross section long in the direction W2OBJ is illustrated.

Hereinafter, the target voxel determining process will be described with reference to FIGS. 12 to 15 in addition to FIG. 11.

Figure 12:
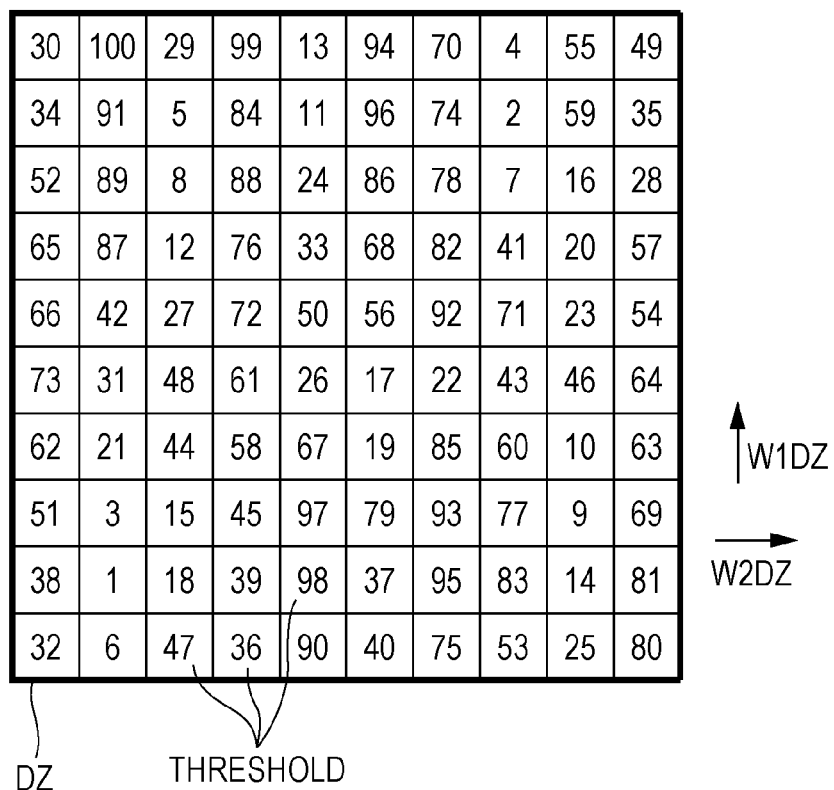
FIG. 12 is an explanatory diagram for describing a dither mask.

FIG. 12 is an example of the dither mask DZ used in the target voxel determining process. Each of a plurality of cells (quadrangular grids) shown in FIG. 12 represents a storage element of the dither mask DZ. A value given to each of the plurality of cells represents a threshold stored in each storage element of the dither mask DZ. In the present embodiment, in a case where the arrangement of dots is determined using the dither mask DZ, a direction W1DZ in which a probability that two dots will be formed so as to be adjacent to each other is expected to become the highest is determined for the dither mask DZ.

Hereinafter, an example in which the dither mask DZ has 100 storage elements in 10 rows and 10 columns and 100 integers from 1 to 100 are stored as thresholds in the 100 storage elements will be described as shown in FIG. 12. In the following description, it is assumed that the dot forming index value RF is an integer which satisfies "$0 \leq RF \leq 100$" acquired by expressing the dot forming rate $\alpha$ as a percentage. In the present embodiment, it is assumed that the plurality of thresholds of the dither mask DZ is determined such that the thresholds are values different from one another.

Figure 13A:
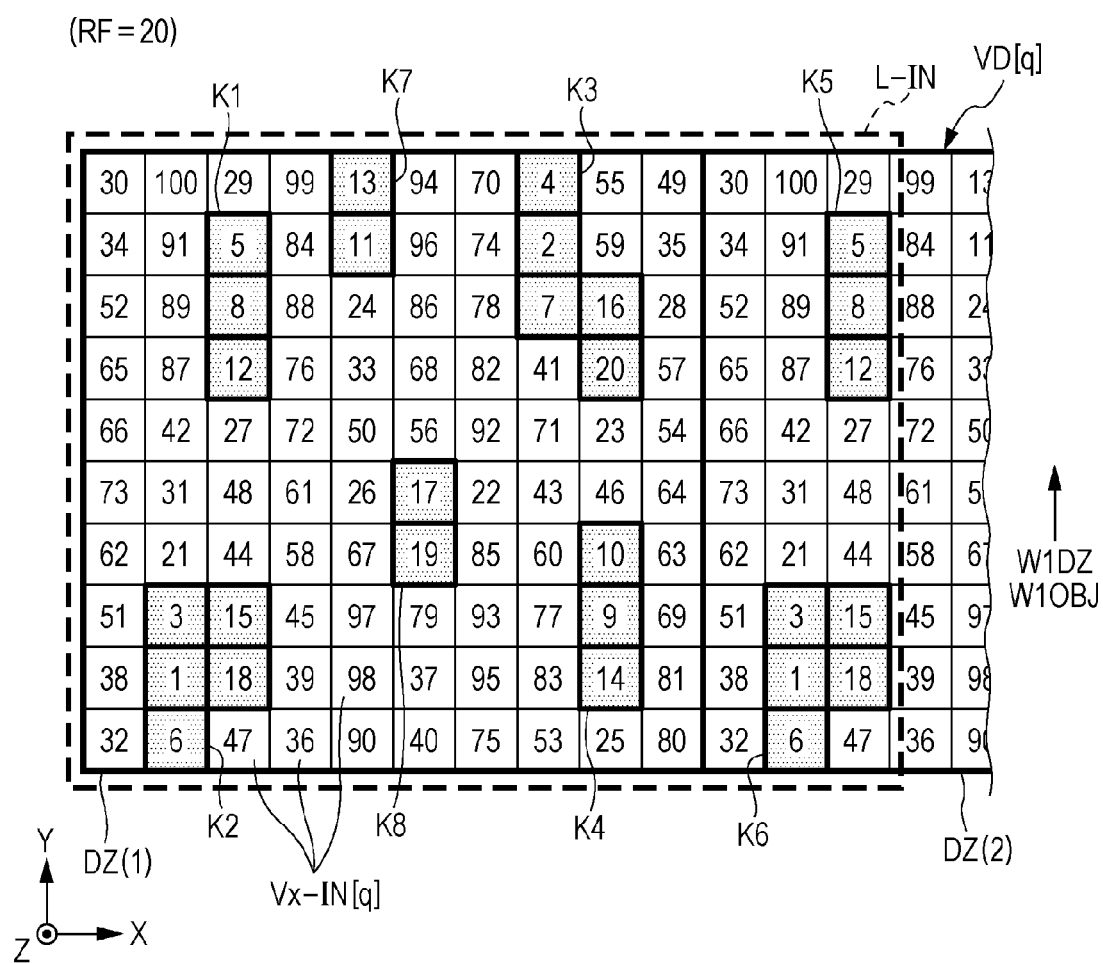
FIG. 13A is an explanatory diagram for describing the dither mask.
Figure 13B:
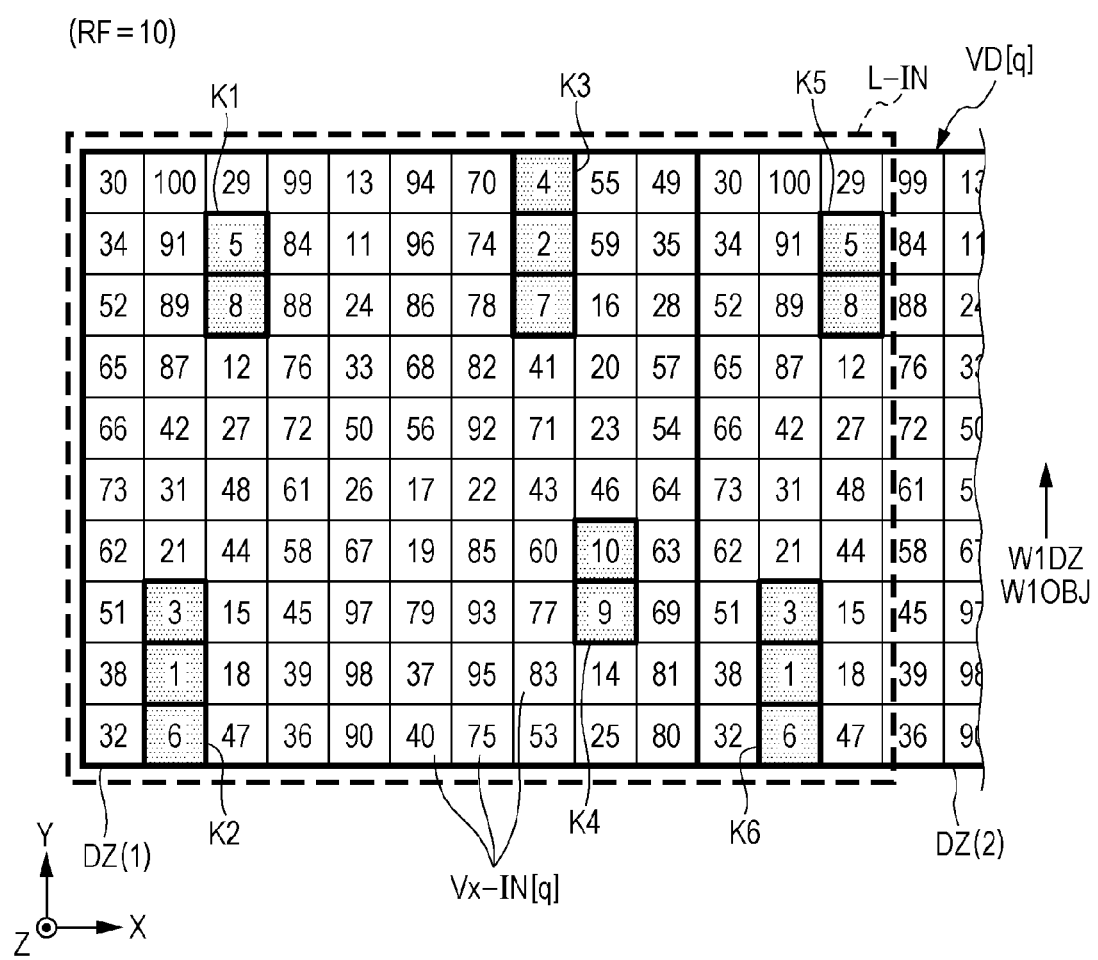
FIG. 13B is an explanatory diagram for describing the dither mask.
Figure 13C:
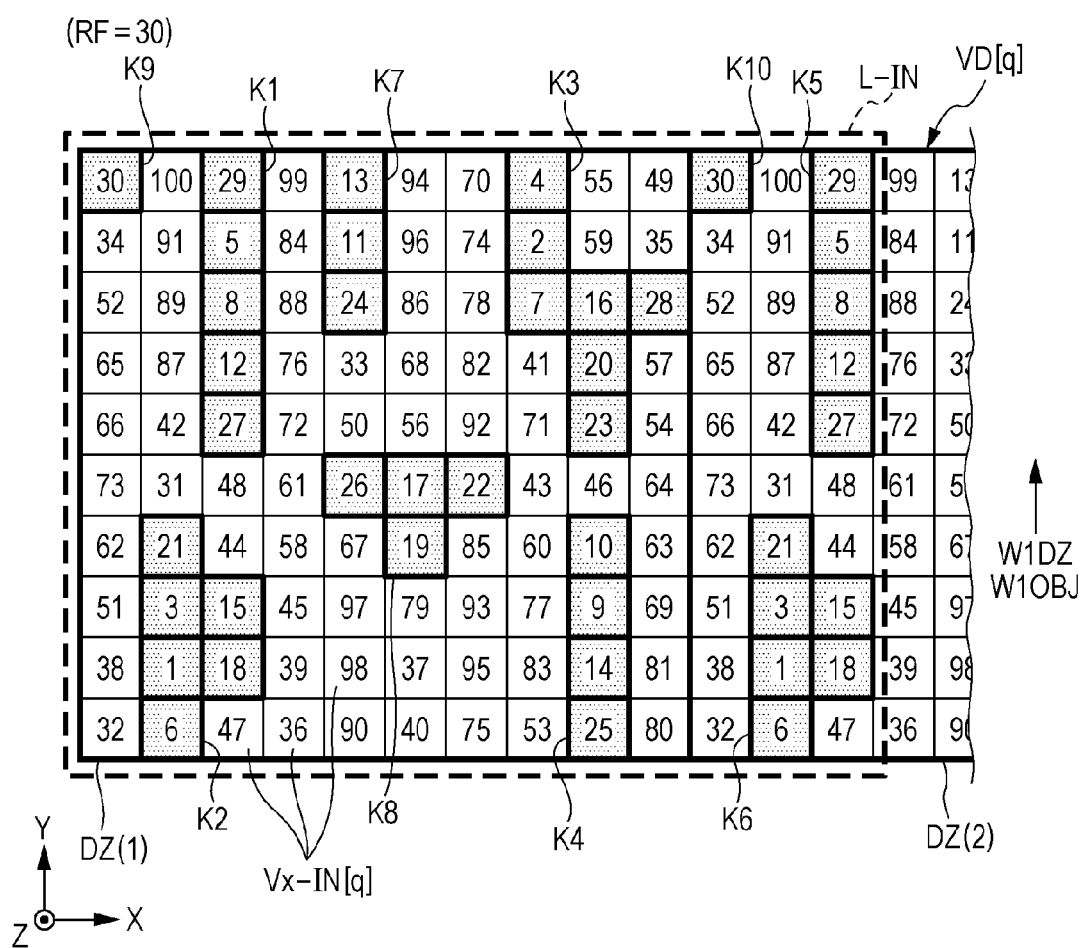
FIG. 13C is an explanatory diagram for describing the dither mask.

FIGS. 13A to 13C are explanatory diagrams for describing the relationship between the plurality of thresholds of the dither mask DZ and the plurality of internal voxels Vx-IN[q] constituting the inside section L-IN among the aggregate of voxels Vx indicated by the voxel data VD[[q].

Each of a plurality of cells shown in FIGS. 13A to 13C represents both each storage element of the dither mask DZ and each internal voxel Vx-IN[q] indicated by the voxel data VD[q]. A value given to each of the plurality of cells represents a threshold stored in each storage element of the dither mask DZ. Among the internal voxels Vx-IN[q], the internal voxels Vx-IN[q] classified as the target voxels VxT are represented as dot-patterned cells, and the internal voxels Vx-IN[q] classified as the non-target voxels VxH are represented as patternless cells.

In the following description, for the sake of convenient description, as shown in FIGS. 13A to 13C, it is assumed that the internal voxels Vx-IN[q] and the storage elements on positions superimposed on the internal voxels Vx-IN[q] when viewed in the Z-axis direction are associated with each other by virtually superimposing the plurality of internal voxels Vx-IN[q] indicated by the voxel data VD[q] and the plurality of storage elements of the dither mask DZ on the XY plane.

In the following description, it is assumed that the respective inside sections L-IN of the structures LY[1] to LY[Q] have rectangular shapes having a length corresponding to as 10 voxels Vx in the X-axis direction and having a length corresponding to 13 voxels Vx in the Y-axis direction.

Figure 14:
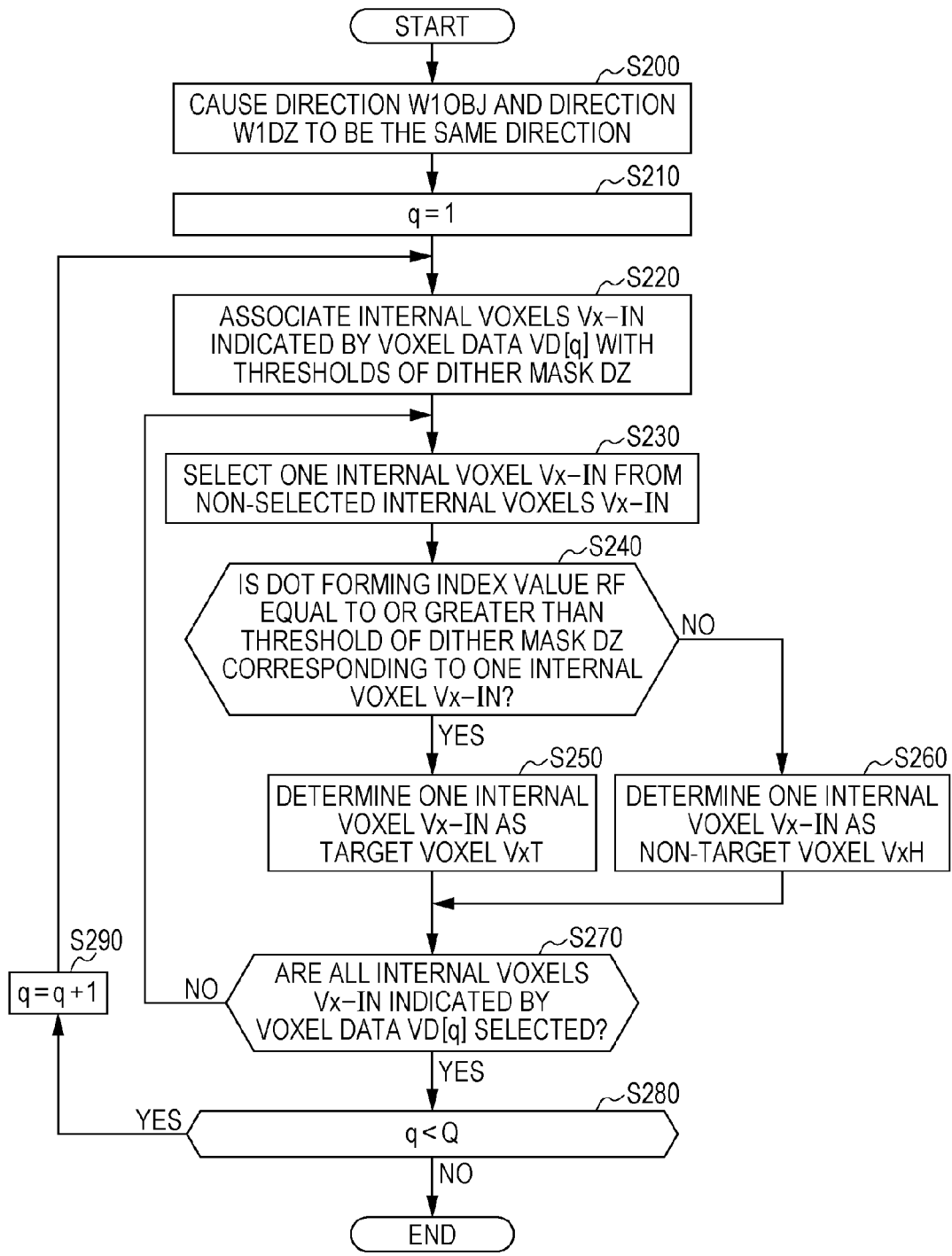
FIG. 14 is a flowchart showing a target voxel determining process.

FIG. 14 is a flowchart showing an example of the operation of the determination unit 95 in a case where the target voxel determining process is performed.

If the target voxel determining process is started, the determination unit 95 initially rotates one or both of the three-dimensional object Obj and the dither mask DZ around the Z axis such that the direction W1OBJ determined for the three-dimensional object Obj and the direction W1DZ determined for the dither mask DZ are set to be the same direction, as shown in FIGS. 13A to 13C (S200).

In step S200, in a case where one or both of the three-dimensional object Obj and the dither mask DZ are rotated in the Z axis, the extending direction of the voxels Vx in the structure forming data SD[q] and the extending direction of the storage elements in the dither mask DZ are set to be different directions in some cases. For example, it is assumed that the extending direction of the voxels Vx indicated by the structure forming data SD[q] becomes a direction in which 45 degrees with respect to the X axis is formed whereas the extending direction of the storage elements of the dither mask DZ becomes the X-axis direction. In such a case, a possibility that a processing load when the respective internal voxels Vx-IN indicated by the structure forming data SD[q] and the respective storage elements of the dither mask DZ are associated in a one-to-one correspondence will be increased becomes high.

Thus, for example, in the generating of the voxel data VD[q] performed in step S110, in a case where the direction W1OBJ and the direction W1DZ are set to be the same direction, the voxel data VD[q] may be generated such that the extending direction of the voxels Vx in the structure forming data SD[q] and the extending direction of the storage elements of the dither mask DZ are set to be the same direction. That is, the voxel data VD[q] shown in FIG. 9 are arranged in a matrix shape in an orientation in which the plurality of voxels Vx is aligned in the X-axis direction and the Y-axis direction, but the present embodiment is not limited to such an aspect. The voxel data VD[q] may be arranged in a matrix shape in an orientation in which the plurality of voxels Vx is aligned in directions different from the X-axis direction and the Y-axis direction. Specifically, it is preferable that the voxel data VD[q] are data items arranged in a matrix shape in an orientation in which the plurality of voxels Vx is aligned in the direction W1OBJ and a direction perpendicular to the direction W1OBJ.

Subsequently, the determination unit 95 initializes the variable q to a value of "1" (S210).

Thereafter, as shown in FIGS. 13A to 13C, the determination unit 95 associates the plurality of internal voxels Vx-IN[q] constituting the inside section L-IN among the aggregate of voxels Vx indicated by the voxel data VD[q] with the plurality of storage elements of the dither mask DZ in a one-to-one correspondence (S220).

However, as in the example shown in FIGS. 13A to 13C, that is, as in a case where the dither mask DZ has 10×10 number of storage elements and the inside section L-IN of the voxel data VD[q] has 10×13 number of voxels Vx-IN, the size (the number of storage elements) of the dither mask DZ is smaller than the size (the number of internal voxels) of the inside section L-IN of the voxel data VD[q] in some cases. In such as case, the same dither mask DZ is provided in plural number and the plurality of dither masks DZ is arranged on the XY plane, so that the plurality of internal voxels Vx-IN indicated by the voxel data VD[q] is covered by the plurality of dither masks DZ. Accordingly, the plurality of storage elements of the plurality of dither masks DZ arranged on the XY plane and the plurality of internal voxels Vx-IN[q] indicated by the voxel data VD[q] arranged on the XY plane can be associated in a one-to-one correspondence.

In FIGS. 13A to 13C, the plurality of internal voxels Vx-IN[q] indicated by the voxel data VD[q] is covered by two dither masks DZ. More specifically, in FIGS. 13A to 13C, an example in which a total of 130 storage elements including the storage elements in 10 rows and 10 columns of the dither mask DZ(1) and the storage elements in 10 rows and 3 columns of the dither mask DZ(2) and the 130 internal voxels Vx-IN[q] of the voxel data VD[q] are associated in a one-to-one correspondence is described.

Thereafter, the determination unit 95 selects one internal voxel Vx-IN[q] from the non-selected internal voxels Vx-IN [q] in the target voxel determining process being performed, among the plurality of internal voxels Vx-IN[q] indicated by the voxel data VD[q] (S230).

Subsequently, the determination unit 95 compares the dot forming index value RF generated in step S120 of FIG. 8 with the threshold corresponding to the one internal voxel Vx-IN[q] in selected in step S230 among the plurality of thresholds of the dither mask DZ, and determines whether or not the dot forming index value RF is equal to or greater than the threshold (S240).

In a case where the determination result in step S240 is positive, that is, in a case where the dot forming index value RF is equal to or greater than the threshold corresponding to one internal voxel Vx-IN[q], the determination unit 95 determines the one internal voxel Vx-IN[q] as the target voxel VxT in which the dot is formed (S250).

Meanwhile, in a case where the determination result in step S240 is negative, the determination unit 95 determines the one internal voxel Vx-IN[q] as the non-target voxel VxH in which the dot is not formed (S260).

Thereafter, the determination unit 95 selects all the internal voxels Vx-IN[q] of the inside section L-IN indicated by the voxel data VD[q] in step S230 of the target voxel determining process being performed, and determines whether or not the respective internal voxels Vx-IN[q] have been classified as any one of the target voxels VxT and the non-target voxels VxH (S270). In a case where the determination unit in step S270 is negative, the determination unit 95 proceeds to the process of step S230. In a case where the determination result in step S270 is positive, the determination unit 95 determines whether or not the variable q satisfies "q<Q" (S280).

In a case where the determination result in step S280 is positive, the determination unit 95 adds "1" to the variable q, and then proceeds to the process of step S220 (S290). In a case where the determination result of step S280 is negative, that is, in a case where the variable q reaches "q=Q", the determination unit 95 ends the target voxel determining process.

As mentioned above, in the target voxel determining process according to the present embodiment, the target voxel VxT is determined such that the pillars K which extend in the Z-axis direction are formed in the inside section L-IN. Thus, in the inside section L-IN, the plurality of target voxels VxT is formed so as to be continued in the Z-axis direction, and the plurality of non-target voxels VxH is formed so as to be continued in the Z-axis direction. That is, in the inside section L-IN, in a case where another internal voxel Vx-IN[q+1] indicated by the voxel data VD[q+1] is present in the +Z direction of one internal voxel Vx-IN[q] indicated by the voxel data VD[q], another internal voxel Vx-IN[q+1] is also the target voxel VxT when one internal voxel Vx-IN[q] is the target voxel VxT, and another internal voxel Vx-IN[q+1] is also the non-target voxel VxH when one internal voxel Vx-IN[q] is the non-target voxel VxH.

Thus, in the present embodiment, the internal voxel Vx-IN[q] and the storage element of the dither mask DZ are associated with each other such that the storage element (or the threshold) of the dither mask DZ corresponding to one internal voxel Vx-IN[q] and the storage element (or the threshold) of the dither mask DZ corresponding to another internal voxel Vx-IN[q+1] are the same. Specifically, in step S230 of FIG. 14, the internal voxel Vx-IN[q] and the storage element of the dither mask DZ are associated with each other such that the position of the dither mask DZ which covers the voxel data VD[q] on the XY plane and the position of the dither mask DZ which covers the voxel data VD[q+1] on the XY plane are the same.

As mentioned above, the pillar K provided in the inside section L-IN of the three-dimensional object Obj extends in the Z-axis direction. Thus, in the present embodiment, the determination unit 95 can determine the number, shape and position of pillars K on the XY plane if the process of step S220 to S270 of FIG. 14 is performed once. For example, as shown in FIG. 11, in a case where the shape of the cross-section body of the inside section L-IN acquired by cutting the inside section L-IN by the XY plane is the same even though the position in the Z-axis direction is changed, the process of steps S220 to S270 is performed on only one voxel data VD, and thus, the processing result in one voxel data VD can be applied to another voxel data VD. Thus, the determination unit 95 may perform the process of step S220 to S270 of FIG. 14 only one time.

Depending on the position in the Z-axis direction, in a case where the shape of the cross-section body of the inside section L-IN is changed depending on a change in the position in the Z-axis direction, virtual voxel data VD which represents the aggregate of internal voxels Vx-IN[q] having the shape acquired by projecting the inside section L-IN on the XY plane may be generated, the process of steps S220 to S270 may be performed on the virtual voxel data VD, and the processing result may be applied to the respective voxel data items VD.

As described above, the determination unit 95 determines the number, shape and position of the pillars K in the inside section L-IN of the three-dimensional object Obj depending on the dot forming index value RF by the target voxel determining process.

For example, in FIG. 13A, since the dot forming index value RF is "20", the internal voxels Vx-IN[q] corresponding to the thresholds which are equal to or less than "20" are determined as the target voxels VxT. Thus, in the example shown in FIG. 13A, among 130 internal voxels Vx-IN[q] included in the voxel data VD[q], 28 internal voxels Vx-IN[q] are classified as the target voxels VxT, and the dots are formed in the positions corresponding to the 28 target voxels VxT. As a result, as shown in FIG. 11, 8 pillars K1 to K8 are formed in the inside section L-IN of the three-dimensional object Obj. In the example shown in FIG. 13A, all of 8 pillars K1 to K8 are the pillars K having the cross section long in the direction W1OBJ.

In contrast, in FIG. 13B, since the dot forming index value RF is "10" which is smaller than that in the case of FIG. 13A, among 130 internal voxel Vx-IN[q] included in the voxel data VD[q], the number of internal voxels Vx-IN[q] classified as the target voxels VxT is 15 which is smaller than that in the case of FIG. 13A. As a result, in FIG. 13B, as much of the pillars K1 to K6 as the number of pillars which is smaller than that in the case of FIG. 13A are formed in the inside section L-IN of the three-dimensional object Obj, and the pillars K have the cross-section area which is smaller than that in the case of FIG. 13A. In the example shown in FIG. 13B, all of 6 pillars K1 to K6 are the pillars K having the cross section long in the direction W1OBJ.

In contrast, in FIG. 13C, since the dot forming index value RF is "30" which is greater than that in the case of FIG. 13A, among 130 internal voxels Vx-IN[q] included in the voxel data VD[q], the number of internal voxels Vx-IN[q] classified as the target voxels VxT is 42 which is greater than that in the case of FIG. 13A. As a result, in FIG. 13C, as much of the pillars K1 to K10 as the number of pillars which is greater than that in the case of FIG. 13A are formed in the inside section L-IN of the three-dimensional object Obj, and the respective pillars K have the cross-sectional area which is greater than that in the case of FIG. 13A. In the example shown in FIG. 13C, among 10 pillars K1 to K10, 9 pillars K other than the pillar K8 are the pillars K having the cross section long in the direction W1OBJ, but the pillar K8 is the pillar K having the cross section long in the direction W2OBJ.

As stated above, in the present embodiment, when at least the dot forming index value RF is equal to or less than a predetermined value (for example, the dot forming index value RF is equal to or less than "30"), the plurality of thresholds of the dither mask DZ is set such that at least the following condition (1) is satisfied.

(1) Of one or the plurality of pillars K formed in the inside section L-IN, the number of pillars K having the cross section long in the direction W1OBJ is greater than the number of pillars K having the cross section long in the direction W2OBJ.

In the target voxel determining process, the structure of the inside section L-IN of the three-dimensional object Obj can be determined such that the strength of the inside section L-IN of the three-dimensional object Obj in the direction W1OBJ is greater than the strength in the direction W2OBJ by using the dither mask DZ which satisfies the condition (1).

In the present embodiment, in the inside section L-IN of the three-dimensional object Obj, when at least the dot forming index value RF is equal to or less than the predetermined value, the plurality of thresholds of the dither mask DZ is set such that as the dot forming index value RF is increased, at least one of an increase in the number of pillars K and an increase in the cross-sectional area in one or more pillars K is achieved. More specifically, in a case where a case where the dot forming index value RF is a value RF1 (an example of a "first value") which is equal to or less than the predetermined value is compared with a case where the dot forming index value is a value RF2 (an example of a "second value") which is less than the value RF1, the plurality of thresholds of the dither mask DZ is set such that one or both of the following conditions (2) and (3) related to the pillars K is satisfied.

(2) In a case where the dot forming index value RF is the value RF1, the cross-sectional area in at least one pillar K of one or the plurality of pillars K provided in the inside section L-IN is greater than that in a case where the dot forming index value is the value RF2.

(3) In a case where the dot forming index value RF is the value RF1, the number of pillars K provided in the inside section L-IN is greater than that in a case where the dot forming index value is the value RF2.

In the target voxel determining process, in a case where the dot forming index value RF is equal to or less than the predetermined value, the structure of the inside section L-IN of the three-dimensional object Obj can be determined such that the strength of the three-dimensional object Obj is increased as the dot forming index value RF is increased by using the dither mask DZ which satisfies at least one of the conditions (2) and (3).

Hereinafter, other conditions (A) to (E) for the arrangement of the plurality of thresholds of the dither mask DZ will be described with reference to FIG. 15.

Figure 15:
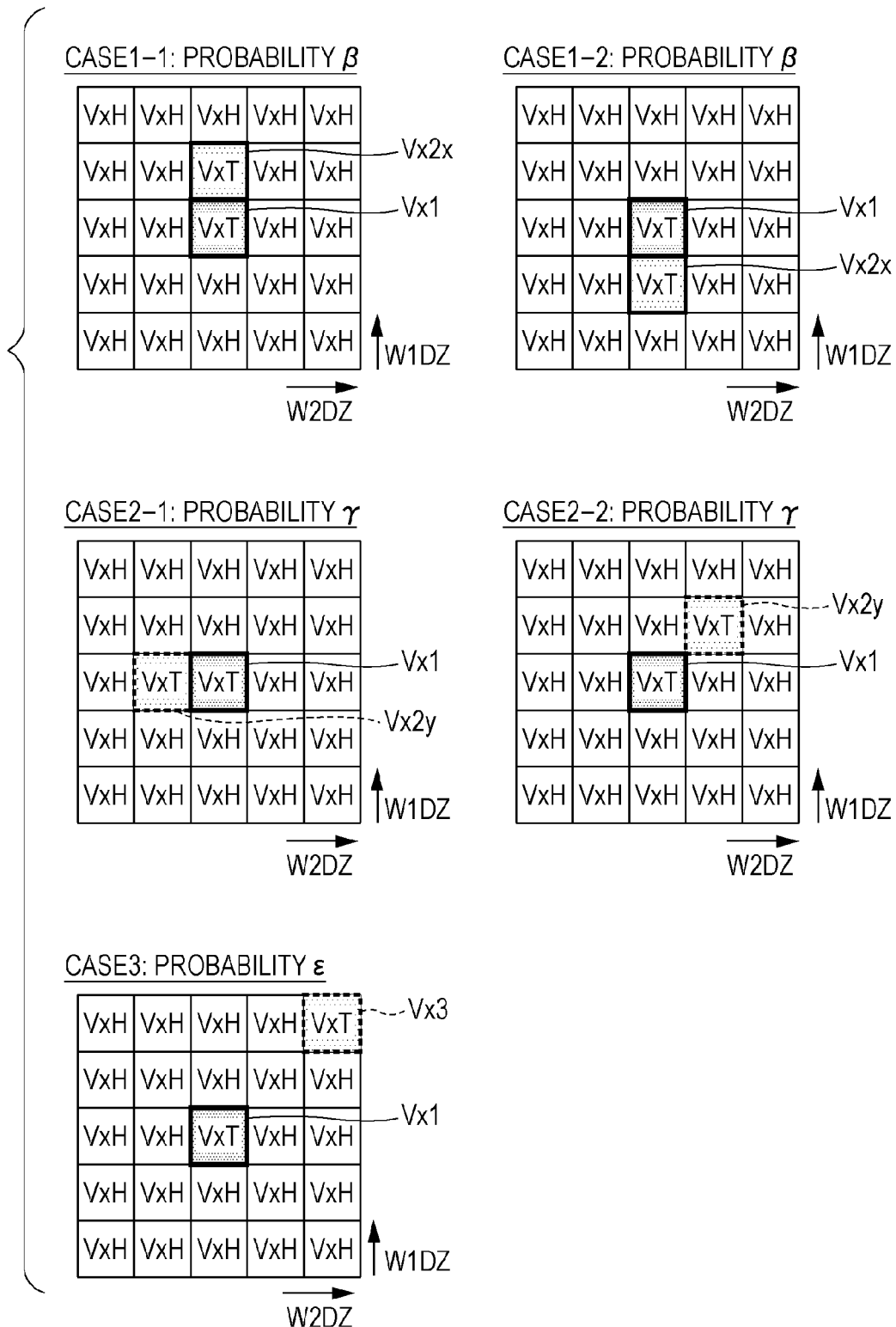
FIG. 15 is an explanatory diagram for describing the dither mask.

FIG. 15 is an explanatory diagram for describing a probability that both of two voxels Vx in the inside section L-IN will be classified as the target voxels VxT.

As shown in FIG. 15, it is assumed that a probability that both of one voxel Vx1 and a voxel Vx2$x$ adjacent to the one voxel Vx1 in a direction opposite to the direction W1DZ or the direction W1DZ will be classified as the target voxels VxT is a probability $\beta$ (Case1-1 and Case1-2). A probability that both of one voxel Vx1 and a voxel Vx2Y other than the voxel Vx2X, which is the voxel Vx adjacent to the one voxel Vx1, will be classified as the target voxels VxT is referred to as a probability $\gamma$ (Case2-1, Case2-2 and the like). A probability that both of one voxel Vx1 and a voxel Vx3 which is not adjacent to the one voxel Vx1 will be classified as the target voxels VxT is referred to as a probability $\varepsilon$ (Case3 and the like).

Here, a certain voxel Vx and another voxel Vx being adjacent to each other means that the distance between these two voxels Vx is equal to or greater than a predetermined value, and preferably means that two voxels Vx are in contact with each other through surface, side or point contact as shown in the Case1-1, Case1-2, Case2-1, or Case2-2 of FIG. 15.

As described above, the determination unit 95 determines the target voxels VxT depending on the result acquired by comparing the dot forming index value RF with the threshold of the dither mask DZ. Thus, in a case where the dither mask DZ has white noise properties, for example, in a case where the plurality of thresholds of the dither mask DZ is randomly arranged, a probability that one voxel Vx in the inside section L-IN will be classified as the target voxel VxT is a dot forming rate "$\alpha$". Thus, in a case where the dither mask DZ has white noise properties, a probability that two arbitrary voxels Vx in the inside section L-IN will be classified as the target voxels VxT is "$\alpha^2$".

In contrast, it is assumed that when at least the dot forming index value RF is equal to or less than the predetermined value, the thresholds are determined such that the dither mask DZ according to the present embodiment satisfies the following conditions (A), (B) and (C).

(A) Probability $\beta$ and probability $\varepsilon$ satisfy "$\beta>\varepsilon$"
(B) Probability $\beta$ and probability $\gamma$ satisfy "$\beta>\gamma$"
(C) Probability $\gamma$ and probability $\varepsilon$ satisfy "$\gamma>\varepsilon$"

The thresholds may be determined such that of the dither mask DZ according to the present embodiment satisfies the following conditions (D) and (E) in addition to the conditions (A) to (C).

(D) Probability $\beta$ satisfies "$\beta>\alpha^2$"
(E) Probability $\gamma$ satisfies "$\gamma>\alpha^2$"

In the present embodiment, in the target voxel determining process, since the dither mask DZ which satisfies the conditions (A) and (B) is used, it is possible to continuously form the dots in the direction W1OBJ, and it is possible to form the three-dimensional object Obj having the internal structure having high strength in the direction W1OBJ.

In the present embodiment, in the target voxel determining process, since the dither mask DZ which satisfies the conditions (C) to (E) is used, it is possible to efficiently form the pillars K in the inside section L-IN, and it is possible to prevent excessively thin pillars K which do not contribute to the obtaining of the strength of the three-dimensional object Obj from being formed.

As described above, the plurality of thresholds of the dither mask DZ is determined such that the dither mask according to the present embodiment satisfies the conditions (1) to (3) and the conditions (A) to (E).

However, the invention is not limited to such an aspect, and the plurality of thresholds of the dither mask DZ may be determined such that the dither mask satisfies at least one of the condition (1), and the conditions (A) and (B).

For example, the plurality of thresholds of the dither mask DZ may be determined such that the dither mask satisfies at least the condition (1), and may be preferably determined such that the dither mask satisfies a part or all of the conditions (1) to (3). In this case, the plurality of thresholds of the dither mask DZ may be determined without considering the conditions (A) to (E), or may be determined such that the dither mask satisfies a part or all of the conditions (A) to (E) by satisfying a part or all of the conditions (1) to (3).

The plurality of thresholds of the dither mask DZ may be determined such that the dither mask satisfies at least the conditions (A) and (B), may be preferably determined such that the dither mask satisfies the conditions (A) to (C), or may be more preferably determined such that the dither mask satisfies the conditions (A) to (E). In this case, the plurality of thresholds of the dither mask DZ may be determined without considering the conditions (1) to (3), or may be determined such that the dither mask satisfies a part or all of the conditions (1) to (3) by satisfying a part or all of the conditions (A) to (E).

5. Conclusion of Embodiment

As described above, in the present embodiment, the internal structure of the three-dimensional object Obj is determined depending on the dot forming index value RF in the target voxel determining process. Thus, it is possible to determine the internal structure of the three-dimensional object Obj without imposing a load of determining the shape of the internal structure of the three-dimensional object Obj, such as a load of designing the internal structure of the three-dimensional object Obj or a load of instructing the shape of the internal structure of the three-dimensional object Obj, on the user of the three-dimensional object forming system 100. Thus, it is possible to reduce the load of forming the three-dimensional object Obj on the user of the three-dimensional object forming system 100.

The structure forming data generating process according to the present embodiment, the dot forming index value RF is determined based on the strength index value ST which is the value corresponding to the strength necessary for the three-dimensional object Obj. In the target voxel determining process according to the present embodiment, the internal structure of the three-dimensional object Obj depending on the dot forming index value RF is determined by applying a halftoning technology to the technology of forming the three-dimensional object and using the dither mask DZ.

Thus, in the target voxel determining process according to the present embodiment, the internal structure of the three-dimensional object Obj can be uniquely determined depending on the requirements of the three-dimensional object Obj such as the shape of the three-dimensional object Obj, the strength to be required for the three-dimensional object Obj, the ink amount capable of being used to form the three-dimensional object Obj, the kind of ink capable of being used to form the three-dimensional object Obj, an allowable forming time to form the three-dimensional object Obj, and the like. In other words, even in a case where the requirement of the three-dimensional object Obj is changed, the user flexibly responds to the change of the requirement, and thus, it is possible to determine the internal structure of the three-dimensional object Obj without imposing an excessive load on the user.

In the target voxel determining process according to the present embodiment, since the dither mask DZ which satisfies at least one of the condition (1) and the conditions (A) and (B) is used, it is possible to determine the structure of the inside section L-IN of the three-dimensional object Obj such that the strength of the inside section L-IN of the three-dimensional object Obj in the direction W1OBJ is greater than the strength in the direction W2OBJ.

Thus, it is possible to increase the strength in the direction W1OBJ which is a direction in which the width is less than that in another direction and the three-dimensional object Obj may easily collapse, and it is possible to remain the entire strength of the three-dimensional object Obj at a high level.

B. MODIFICATION EXAMPLES

The above-described embodiments may be modified in various manners. Specific modification aspects are described as follows. Two or more aspects arbitrarily selected from the following examples may be appropriately combined without being mutually conflicted.

The components of the following modification examples having the same advantages or functions as those of the embodiments will be assigned the reference numerals used in the above-mentioned description, and the detailed description will not be appropriately repeated.

Modification Example 1

In the above-described embodiments and the modification examples, the direction W1OBJ is a direction in which the width of the cut cross section of the three-dimensional object Obj is the narrowest, but the invention is not limited to such an aspect. However, the direction W1OBJ may be determined such that the width of the cut cross section of the three-dimensional object Obj in the direction W1OBJ is less than the width of the cut cross section of the three-dimensional object Obj in the direction W2OBJ.

Modification Example 2

In the above-described embodiments and the modification examples, one direction W1OBJ is determined for one three-dimensional object Obj, but the invention is not limited to such an aspect. A plurality of directions W1OBJ may be determined for one three-dimensional object Obj.

Specifically, for example, in a case where the three-dimensional object has a complicated shape such as a case where the three-dimensional object Obj has a protrusion and a recess, the three-dimensional object Obj may be appropriately divided such that the shape of the cut cross section cut by the XY plane of the three-dimensional object Obj does not have a recess, and the direction W1OBJ may be determined for each of the divided three-dimensional object Obj based on the width of the cut cross section cut by the XY plane.

Modification Example 3

In the above-described embodiments and the modification example, the direction W1OBJ is determined based on the shape of the three-dimensional object Obj by the model data generating unit 92 or the structure forming data generating unit 93, but the invention is not limited to such an aspect. The user of the three-dimensional object forming system 100 may determine the direction W1OBJ by means of the display operation unit 91 or the like. In this case, it is possible to maintain the strength in the direction depending on the purpose of use of the three-dimensional object Obj.

Modification Example 4

In the above-described embodiments and the modification examples, the size of the dither mask DZ is a 10×10 matrix, but is merely an example. The dither mask DZ may have a size of at least a 2×2 matrix or greater.

In the above-described embodiments and the modification examples, the shape of the dither mask DZ is a quadrangular shape (square matrix), but the invention is not limited to such an aspect. The dither mask DZ may have a rectangular shape of which the number of rows and the number of columns are different, or may have an arbitrary shape other than the quadrangular shape. However, in the target voxel determining process, it is preferable that the plurality of dither masks DZ has a shape capable of being filled on the plane so as to be virtually arranged on the XY plane without being superimposed.

Modification Example 5

In the above-described embodiments and the modification examples, the plurality of thresholds of the dither mask DZ is determined to be different unique values, but the invention is not limited to such an aspect. Two or more thresholds may have the same value.

In the above-described embodiments and the modification examples, each threshold of the dither mask DZ is an integer, but the invention is not limited to such an aspect. The plurality of thresholds of the dither mask DZ may be a real number other than the integer.

In the above-described embodiments and the modification examples, a range capable of acquiring the dot forming index value RF is set to be $0 \leq RF \leq 100$ and a range capable of acquiring each threshold of the dither mask DZ is set to be 1 or more and 100 or less, but these ranges are merely examples. In the invention, the range capable of acquiring the dot forming index value RF and the range capable of acquiring each threshold of the dither mask DZ may be the mutually associated ranges to which a so-called halftoning process of comparing the dot forming index value RF and the threshold of the dither mask DZ and binarizing the dot forming index value RF depending on the comparison result can be applied. For example, an acquirable minimum value of the dot forming index value RF may be set to be a value substantially equal to a minimum threshold of the dither mask DZ or a value of the minimum threshold or more, and an acquirable maximum value of the dot forming index value RF may be set to be a value substantially equal to a maximum threshold of the dither mask DZ or a value of the maximum threshold or less. At least a part or all of the acquirable range of each threshold of the dither mask DZ may overlap with a part of all of the acquirable range of the dot forming index value RF.

Modification Example 6

In the above-described embodiments and the modification examples, the strength index value ST is generated by the model data generating unit 92, but the invention is not limited to such an aspect. The structure forming data generating unit 93 may generate the strength index value ST based on the model data Dat, or the user of the three-dimensional object forming system 100 may input the strength index strength ST by using the display operation unit 91.

In the above-described embodiments and the modification examples, the dot forming index value RF is generated by the structure forming data generating unit 93, but the invention is not limited to such an aspect. The model data generating unit 92 may generate the dot forming index value RF based on the model data Dat, or the user of the three-dimensional object forming system 100 may input the dot forming index value RF by using the display operation unit 91.

Modification Example 7

In the above-described embodiments and the modification examples, the structure forming data generating unit 93 is provided in the host computer 9, but the invention is not limited to such an aspect. The structure forming data generating unit 93 may be provided in the three-dimensional object forming apparatus 1. That is, the structure forming data generating unit 93 may be a functional block realized by executing the program stored in the storage unit 60 by means of the CPU of the three-dimensional object forming apparatus 1. In this case, it is preferable that the storage unit 60 stores the dither mask DZ.

As in the present modification example, in a case where the three-dimensional object forming apparatus 1 includes the structure forming data generating unit 93, it is possible to generate the structure forming data SD based on the model data Dat supplied from the outside of the three-dimensional object forming apparatus 1, and it is possible to form the three-dimensional object Obj based on the waveform designation signal SI generated using the generated structure forming data SD.

Modification Example 8

In the above-described embodiments and the modification examples, the three-dimensional object forming system 100 includes the model data generating unit 92, but the invention is not limited to such an aspect. The three-dimensional object forming system 100 may not include the model data generating unit 92. That is, the three-dimensional object forming system 100 may form the three-dimensional object Obj based on the model data Dat supplied from the outside of the three-dimensional object forming system 100.

Modification Example 9

In the above-described embodiments and the modification examples, the three-dimensional object forming apparatus 1 can discharge 6 kinds of inks, but the invention is not limited to such an aspect. The three-dimensional object forming apparatus 1 may can discharge at least one or more kinds of forming ink.

Modification Example 10

In the above-described embodiments and the modification examples, the three-dimensional object forming apparatus 1 forms the three-dimensional object Obj by stacking the structures LY formed by curing the forming inks, but the invention is not limited to such an aspect. The structures LY may be formed by solidifying powder laid in a layer shape by using the curable forming ink, and the three-dimensional object Obj may be formed by stacking the formed structures LY.

In this case, the three-dimensional object forming apparatus 1 may include a powder layer forming unit (not shown) that forms a powder layer PW by laying the powder on the forming table 45 with a predetermined thickness $\Delta Z$, and a powder discarding unit (not shown) that discards extra powder which does not constitute the three-dimensional object Obj after the three-dimensional object Obj is formed.

Hereinafter, the powder layer PW for forming the structure LY[q] is referred to as a powder layer PW[q].

Figure 16:
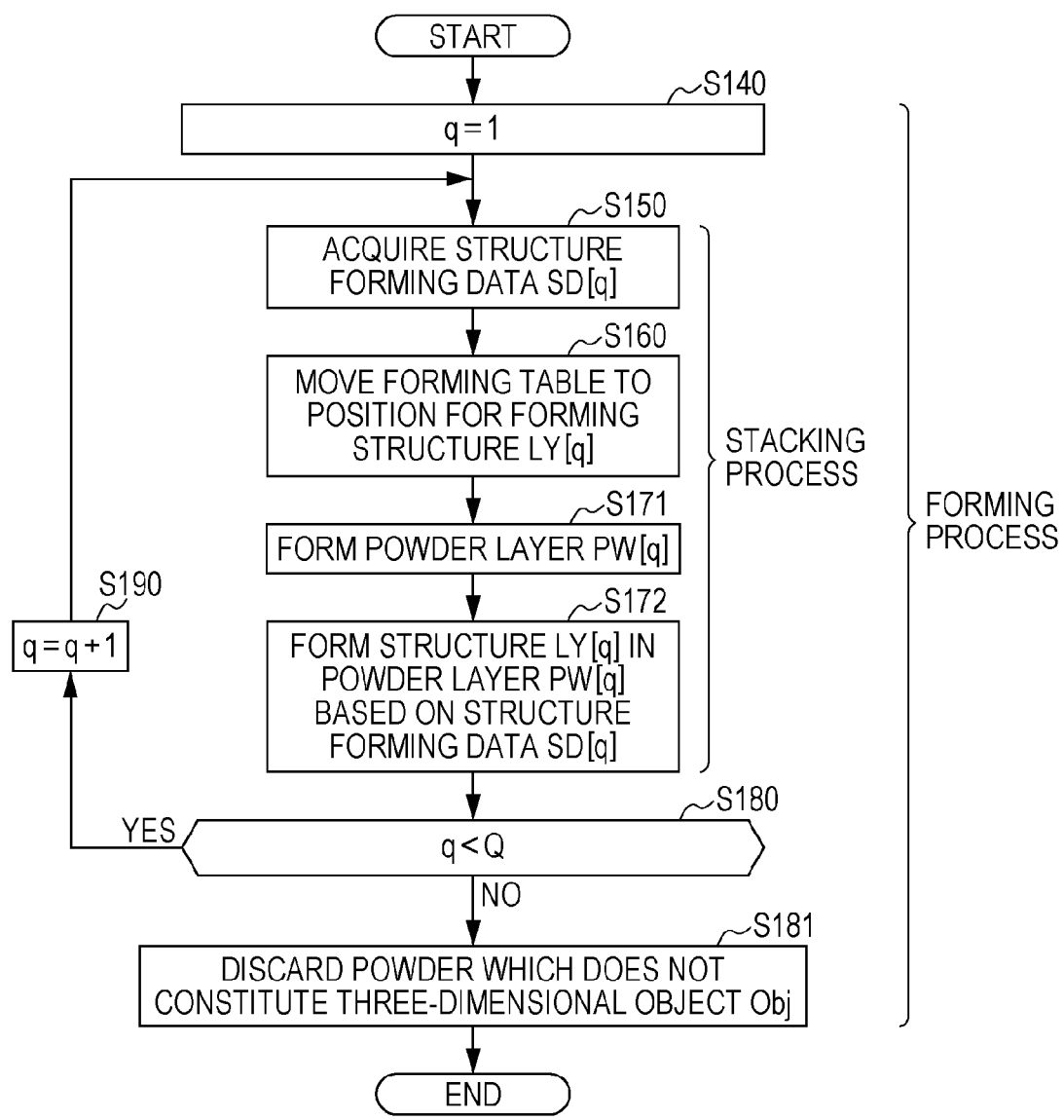
FIG. 16 is a flowchart showing a forming process according to Modification Example 10.

FIG. 16 is a flowchart showing an example of the operation of the three-dimensional object forming system 100 in a case where the forming process according to the present modification example is performed. The forming process according to the present modification example shown in FIG. 16 is the same as the forming process according to the embodiment shown in FIG. 8 except that the process of steps S171 and S172 is performed instead of step S170 and the process of step S181 is performed in a case where the determination result in step S180 is positive.

As shown in FIG. 16, the forming control unit 6 according to the present modification example controls the operations of the respective units of the three-dimensional object forming apparatus 1 such that the powder layer forming unit forms the powder layer PW[q] (S171).

The forming control unit 6 according to the present modification example controls the operations of the respective units of the three-dimensional object forming apparatus 1 such that the dot is formed on the powder layer PW[q] based on the structure forming data SD[q] and the structure LY[q] is formed using the dot (S172). Specifically, in step S172, the forming control unit 6 initially controls the operations of the head unit 3 and the like such that the waveform designation signal SI is generated using the structure forming data SD[q] and the ink is discharged to the powder layer PW[q] by the generated waveform designation signal SI. Subsequently, the forming control unit 6 forms the dot including the powder and the ink by controlling the operation of the curing unit 61 such that the ink discharged to the powder layer PW[q] is cured together with the powder. The structure LY[q] is formed by the dot formed in the powder layer PW[q].

The forming control unit 6 according to the present embodiment controls the operation of the powder discarding unit such that the powder which does not constitute the three-dimensional object Obj is discarded after the three-dimensional object Obj is formed (S181).

FIG. 17 is an explanatory diagram for describing the relationship between the model data Dat and the cross-section model data Ldat[q], the structure forming data SD[q], the powder layer PW[q], and the structure LY[q] according to the present modification example.

Among these data items, as in the Phase-A and Phase-C shown in FIG. 9, an example in which the cross-section model data items Ldat[1] and Ldat[2] are generated is illustrated in Phase-A and Phase-B states shown in FIG. 17. In the present modification example, the cross-section model data Ldat[q] is generated by slicing the model of the three-dimensional object Obj indicated by the model data Dat and the structure data SD[q] is generated from the cross-section model data Ldat[q], so that the structure LY[q] is formed by the dot formed based on the waveform designation signal SI generated using the structure forming data SD[q]. Hereinafter, the forming of the structure LY[q] according to the present modification example will be described.

In a Phase-C state shown in FIG. 18, the forming control unit 6 controls the operation of the powder layer forming unit such that the powder layer PW[1] having the predetermined thickness ΔZ is formed before the structure LY[1] is formed (see step S171 described above).

Thereafter, in a Phase-D state shown in FIG. 18, the forming control unit 6 controls the operations of the respective units of the three-dimensional object forming apparatus 1 such that the structure LY[1] is formed within the powder layer PW[1] (see step S172 described above). Specifically, the forming control unit 6 initially discharges the ink to the powder layer PW[1] by controlling the operations of the head unit 3 and the like based on the waveform designation signal SI generated using the structure forming data SD[1]. Subsequently, the forming control unit 6 forms the dot in the powder layer PW[1], and forms the structure LY[1] using the plurality of dots by controlling the operation of the curing unit 61 such that the ink formed in the powder layer PW[1] is cured.

Thereafter, in a Phase-E state shown in FIG. 18, the forming control unit 6 controls the powder layer forming unit such that the powder layer PW[2] having the predetermined thickness ΔZ is formed on the powder layer PW[1] and the structure LY[1]. In a Phase-F shown in FIG. 18, the forming control unit 6 controls the operations of the respective units such as the head unit 3 and the like such that the structure LY[2] is formed.

As stated above, the forming control unit 6 forms the three-dimensional object Obj by controlling the execution of the stacking process of forming the structure LY[q] within the powder layer PW[q] based on the waveform designation signal SI generated using the structure forming data SD[q] and stacking the structures LY[q].

Modification Example 11

In the above-described embodiments and the modification examples, the ink discharged from the discharge unit D is a curable ink such as an ultraviolet curable ink, but the invention is not limited to such an aspect. An ink made of a thermosetting resin may be used.

In this case, it is preferable that the ink is discharged in a state in which the ink is heated in the discharge unit D. For example, the discharge unit D according to the present modification example may discharging an ink in a so-called thermal method of discharging the ink by heating a heating element (not shown) provided in the cavity 320, generating bubbles within the cavity 320, and increasing the pressure within the cavity 320. In this case, since the ink discharged from the discharge unit D is cured by being cooled by external air, the three-dimensional object forming apparatus 1 may not include the curing unit 61.

Modification Example 12

In the above-described embodiments and the modification examples, the three-dimensional object forming apparatus 1 can form the dot having the size which satisfies one voxel Vx, but the invention is not limited to such an aspect. The three-dimensional object forming apparatus 1 may form dots having a plurality of sizes. For example, the three-dimensional object forming apparatus 1 may form dots having three kinds of sizes including a small dot having a size which is one third of the size of the voxel Vx, a medium dot having a size which is two thirds of the size of the voxel Vx and a large dot which satisfies all the voxels Vx.

In a case where the three-dimensional object forming apparatus 1 can form the dots having the plurality of sizes, the forming control unit 6 supplies a driving waveform signal Com having a plurality of waveforms to the driving signal generating unit 31 of the head unit 3 at every unit period of time Tu. Under the control of the forming control unit 6, the driving signal generating unit 31 may generate the driving signal Vin[m] by switching the selection of a part or all of the plurality of waveforms of the driving waveform signal Com depending on the size of the dot to be formed by the ink discharged from the discharge unit D[m] or the non-selection of the waveform, and may supply the generated driving signal Vin[m] to the discharge unit D[m].

The driving waveform signal Com may have waveforms different for the kinds of inks. The number of bits of the waveform designation signal SI[m] may be appropriately determined depending on the number of sizes of dot formed by the ink discharged from the discharge unit D.

The entire disclosure of Japanese Patent Application No. 2015-150262, filed Jul. 30, 2015 is expressly incorporated reference herein.

What is claimed is:

1. A three-dimensional object forming apparatus comprising:
    a head unit configured to discharge a liquid;
    a curing unit configured to cure the liquid discharged from the head unit so as to form dots;
    a forming control unit programmed to control an operation of the head unit such that a three-dimensional object is formed as an aggregate of dots by representing a shape of the three-dimensional object to be formed as a voxel-set and forming dots in target voxels of the voxel-set; and
    a determination unit programmed to determine the target voxels in which dots are to be formed such that one or more pillars that extend in a predetermined direction are forming based on a forming index value, which is a value based on a probability that a dot is formed in a voxel on an inside of the three-dimensional object, and such that (i) a number of pillars of the one or more pillars that have a cross section of which a length in a first direction is greater than a length in a second direction crossing the first direction, is greater than (ii) a number of pillars that have a cross section of which the length in the second direction is greater than the length in the first direction.

2. The three-dimensional object forming apparatus according to claim 1,
    wherein a length of the three-dimensional object in the second direction is equal to or greater than a length of the three-dimensional object in the first direction.

3. The three-dimensional object forming apparatus according to claim 1,
    wherein the determination unit is programmed to determine the target voxels in which a dot is to be formed such that, with respect to at least one of the one or more pillars that is formed on the inside of the three-dimensional object, a cross-sectional area of the at least one pillar in a case where the forming index value is a first value is greater than a cross-sectional area of the at least one pillar in a case where the forming index value is a second value that is less than the first value.

4. The three-dimensional object forming apparatus according to claim 1,
    wherein the determination unit is programmed to determine the target voxels in which a dot is to be formed such that a number of pillars formed on the inside of the three-dimensional object in a case where the forming index value is a first value is greater than a number of pillars formed in the three-dimensional object in a case where the forming index value is a second value that is less than the first value.

5. A three-dimensional object forming apparatus comprising:
    a head unit configured to discharge a liquid;
    a curing unit configured to cure the liquid discharged from the head unit so as to form dots; and
    a forming control unit programmed to control an operation of the head unit such that a three-dimensional object is formed as an aggregate of dots by representing a shape of the three-dimensional object to be formed as a voxel-set and forming dots in target voxels of the voxel-set; and
    a determination unit programmed to determine the target voxels in which dots are to be formed based on a forming index value, which is a value based on a probability that a dot is formed in a voxel on an inside of the three-dimensional object, such that (i) a probability that dots are formed in both of a first voxel of the voxel-set that is positioned on the inside of the three-dimensional object and a second voxel of the voxel-set that is positioned on the inside of the three-dimensional object and is separated from the first voxel at a distance of a predetermined value or less, is greater than (ii) a probability that dots are formed in both of the first voxel of the voxel-set and a third voxel of the voxel-set that is positioned on the inside of the three-dimensional object and is separated from the first voxel at a distance of a predetermined value or greater.

6. The three-dimensional object forming apparatus according to claim 1,
    wherein the determination unit is programmed to determine the target voxels in which the dots are formed such that the one or more pillars are formed on the inside of the three-dimensional object based on a result of comparing the forming index value with a threshold of a dither mask.

* * * * *